US011131294B1

(12) United States Patent
Bauman et al.

(10) Patent No.: US 11,131,294 B1
(45) Date of Patent: Sep. 28, 2021

(54) SHAPE MEMORY ALLOY TUBE CONTINUOUS ROTATION ACTUATOR

(71) Applicant: United States of America as represented by the Administrator of NASA, Washington, DC (US)

(72) Inventors: Steven W. Bauman, Cleveland, OH (US); Othmane Benafan, Middleburg Heights, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 16/751,658

(22) Filed: Jan. 24, 2020

(51) Int. Cl.
*F03G 7/06* (2006.01)
*F16H 1/28* (2006.01)

(52) U.S. Cl.
CPC ............... *F03G 7/065* (2013.01); *F16H 1/28* (2013.01)

(58) Field of Classification Search
CPC ........................................................ F03G 7/065
USPC ...................................................... 60/526–528
See application file for complete search history.

(56) References Cited

U.S. PATENT DOCUMENTS

| | | | | |
|---|---|---|---|---|
| 5,127,228 A * | 7/1992 | Swenson | ................ | F03G 7/065 60/527 |
| 6,065,934 A * | 5/2000 | Jacot | ....................... | F03G 7/065 244/99.8 |
| 6,633,095 B1 * | 10/2003 | Swope | ................... | H02N 10/00 310/12.19 |
| 7,159,398 B1 | 1/2007 | Bushnell et al. | | |
| 8,726,652 B1 * | 5/2014 | Gunter | .................... | F03G 7/065 60/527 |
| 9,885,345 B2 * | 2/2018 | Calkins | .................. | F03G 7/065 |
| 2013/0160445 A1 * | 6/2013 | Olson | ..................... | F03G 7/065 60/527 |
| 2016/0169213 A1 * | 6/2016 | Calkins | .................. | F03G 7/065 60/527 |
| 2016/0348580 A1 * | 12/2016 | Mabe | ...................... | F03G 7/065 |
| 2019/0048860 A1 * | 2/2019 | Karnofski | .............. | F01D 15/12 |

OTHER PUBLICATIONS

O. Benafan and D.J. Gaydosh, Scale-up of NiTiHf shape memory alloy tubes with high torque capability, Smart Mater. Struct. 28 (2019) 085035 (12pp).

(Continued)

*Primary Examiner* — Shafiq Mian
(74) *Attorney, Agent, or Firm* — Robert H. Earp, III; Mark Wolfgang; Helen M. Gaius

(57) ABSTRACT

A scalable plurality of shape memory alloy (SMA) elements are configured to provide a continuous rotation actuator system. The plurality of SMA elements are coupled to a Ring Gear element, as well as to a Sun Gear element and a provision for thermal cycle return assist of the SMA elements. A plurality of Transmission elements provide for controlled rotary actuation in a desired direction with lock capability that provides for continuous rotary motion even as the SMA elements undergo reciprocating rotary action during their thermal cycling without running into system component rotation limits. The innovation distinguishes over other innovative approaches by way of at least the Ring Gear element, the manner of lock control, and the return assist element.

16 Claims, 18 Drawing Sheets

(56) References Cited

OTHER PUBLICATIONS

O. Benafan and D. J. Gaydosh, "Constant-torque thermal cycling and two-way shape memory effect in Ni50.3Ti29.7Hf20 torque tube," Smart Materials and Structures, 2018, vol. 27-075035 (9pp).
O. Benafan and D. J. Gaydosh, "High temperature shape memory alloy Ni50.3Ti29.7Hf20 torque tube actuators," Smart Materials and Structures, 2017, vol. 26-095002 (14pp).
Benafan, O., et al. "Role of B19 martensite deformation in stabilizing two-way shape memory behavior in NiTi." Journal of Applied Physics 112.9 (2012): 093510].

* cited by examiner

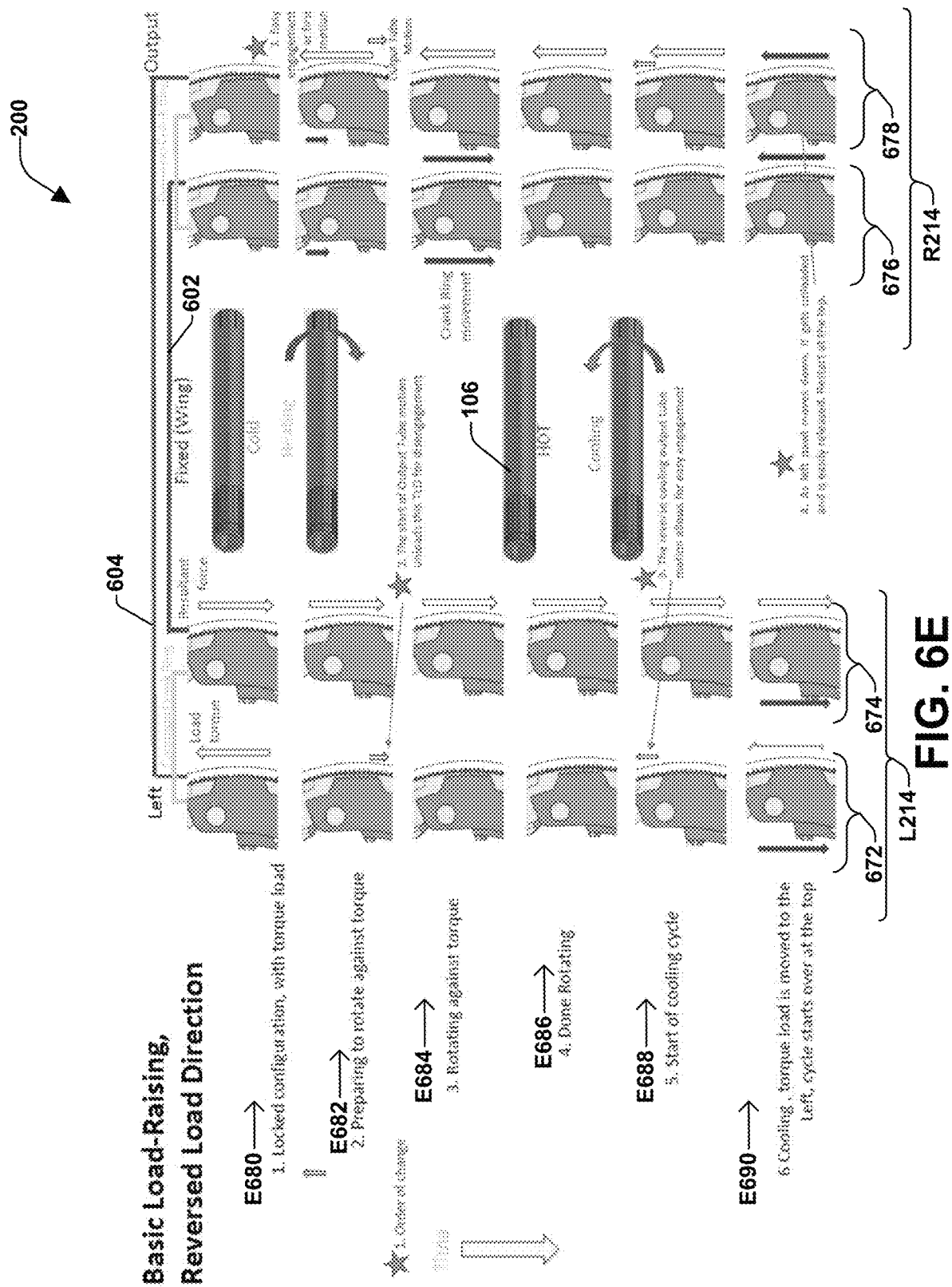

SHAPE MEMORY ALLOY TUBE CONTINUOUS ROTATION ACTUATOR

ORIGIN OF THE INVENTION

The invention described herein was made by employees of the United States Government and may be manufactured and used only by or for the Government for Government purposes without the payment of any royalties thereon or therefore.

CROSS-REFERENCE TO RELATED APPLICATIONS

This application claims the benefit of U.S. Provisional Patent Application Ser. No. 62/797,730 entitled "Shape Memory Alloy Tube Continuous Rotation Actuator" filed on Jan. 28, 2019, the entirety of which is incorporated by reference herein.

TECHNICAL FIELD

The innovation generally relates to actuators, actuator systems, or improvements thereof for a class of mechanisms that use Shape Memory Alloy (SMA) material and features beneficial power/footprint considerations for engineering tradeoffs. Specifically, a plurality (which may provide scalability) of SMA elements (such as may be shaped into tubes, or SMT (shape memory tubes), for example) may be configured to provide a Ring Drive element (as a drive train) that has advantages over a sun gear drive train. Aspects of the innovation also address switching means of applying the power of SMA materials in continuous rotary ouput. Additional aspects that distinguish over other innovative approaches are shown by way of at least the manner of lock control and a return assist element.

BACKGROUND

Conventional rotary actuation with the use of Shape Memory Alloy (SMA) material has been constrained to uses that provide a reciprocating direction of derived power based on the material inducing movement in one direction when heated, and a movement in the opposite direction when cooled, as occurs during a full thermal cycle of the material.

Although having drawbacks, an implementation in the art was made by Calkins et al., of US Letters Patent 9885345 (herein "Calkins" or "Calkins' innovation"). The implementation uses a combination of a ratchet/sprag gear combination and a central sun gear as a drive train to provide continuous rotary articulation in a chosen direction (either clockwise CW or counterclockwise CCW). The advance provides a type of locking mechanism such that conventional reciprocation does not occur for the output when the material is cooled.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

A Ring drive mechanism that provides continual (as opposed to continuous) torque delivery in more than a reciprocal capacity may include innovative locking and return state features. Such a mechanism has an innovative approach to providing rotational output in either chosen direction of clockwise CW or counter-clockwise CCW, true same configuration ability to "lock" the provided output to prevent a reciprocal effect that may otherwise occur due to thermal cycling of the SMA, the ability to provide specified load, torque or actuation without requiring constant heat application to the SMA materials, and an augmented return to original SMA state capability within a constrained physical envelope. It is to be appreciated that while the innovation may be discussed in relation to a form of a tube, the innovative aspects are not limited to that shape.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

FIGS. 6A-6E illustrate a set of example methods relating to aspects of the innovation.

DETAILED DESCRIPTION

Figure 1A:
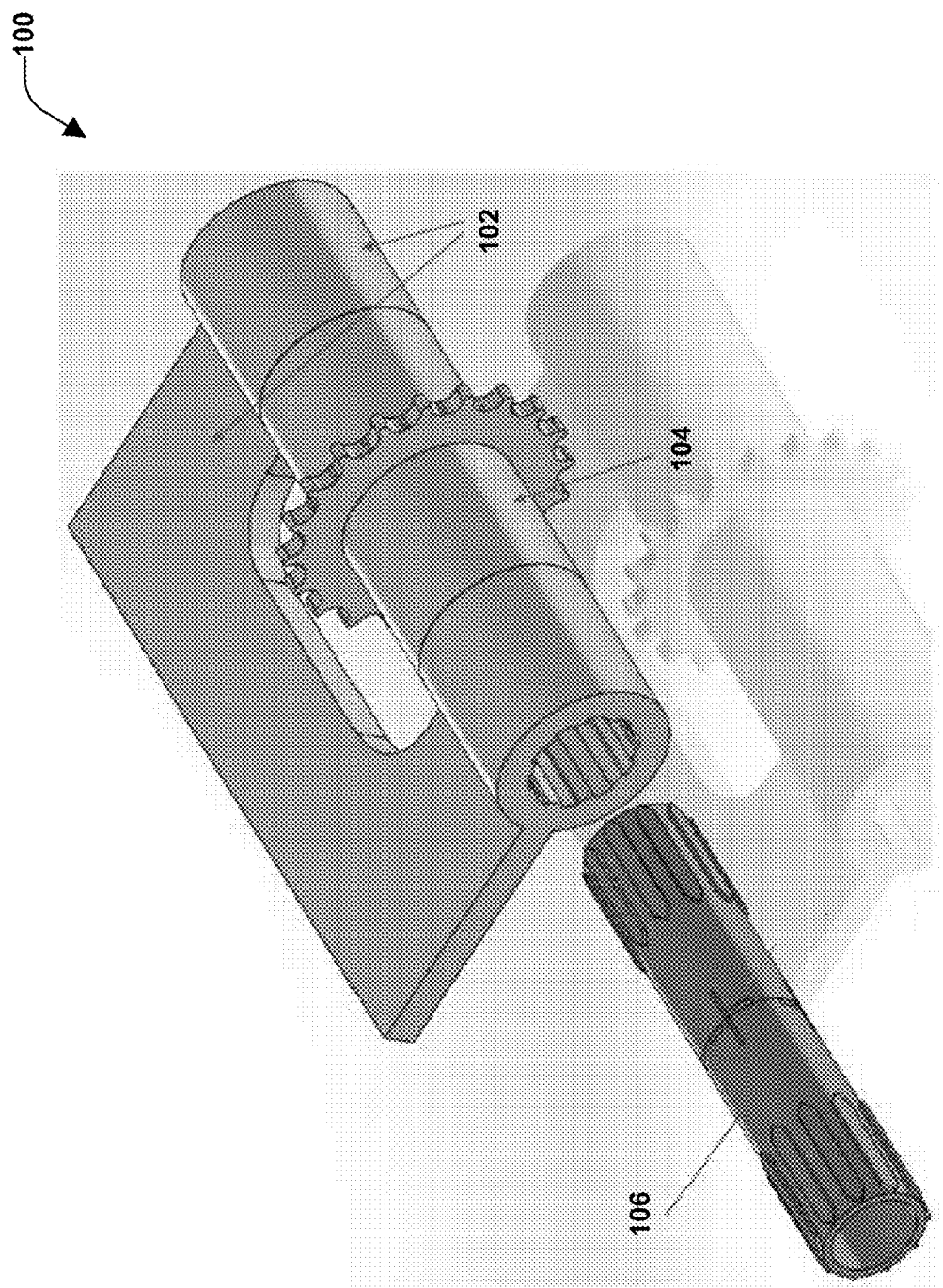
FIG. 1A-1C illustrate an example component diagram of an application component according an embodiment of the innovation . . . .

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

The present innovation provides for advances over conventional prior concepts with alternative and innovative approaches to locking and gearing, as well as providing for attributes and functionality not present in prior systems (e.g., the Calkins' innovation). Since some prior innovations "walk" (or rotates) both ends of the plurality of SM tubes with the combination of sprag and ratchet locks, these innovations are not concerned with real world aspects under working conditions such as a return twist during cooling which often may not fully return a tube to its initial starting point. These and other features, functions and benefits are to be recognized and will be understood upon a review of this disclosure of the innovation herein.

In general, Shape Memory Alloy (SMA) (and as an example, SMA formed into tubes (SMT)), when heated to a particular temperature, undergoes a crystalline transformation of the alloy from martensite to austenite, with a resulting change of shape accompanied with a great deal of force. It is to be appreciated that various SMA chemistries provide for different transition temperature points, from 500 degrees Celsius to 225 degrees Celsius and much lower, with even some transition temperature points below 0 degrees Celsius. Such an SMA configured into a SMT may be "trained" to have a transformation which yields a twisting of the tube, providing a rotary motion at one end relative to the other. When cooled to its martensitic state, the SMT is inclined to return/retract close to its original shape, although for complete cycle repeatability, a reversing torsional bias force may need to be provided to the SMT. It is to be further appreciated that elements described herein may be varied for different applications to achieve various effects and trade-offs. For example, thickness and lengths of SMTs, aspects of gear sizing, spring selection, and various manner of providing and controlling thermal cycling are to be considered in view of, and within the disclosure herein.

For ease of understanding, aspects of the innovation may be discussed primarily in an embodiment of a drop-in replacement actuator for an F-18 Navy Jet folding winglet, which stimulated development of the innovation in order to provide a power/envelope solution. The conception, reduction to practice and implementation or development of the innovation thus included addressing power, timing, locking, and physical envelope constraints. For example, the embodiment of a drop-in replacement provided several constraints including an envelope of a maximum diameter of 4.5 inches and a maximum length of 31.45 inches. The capability of exerting 20,000 in-lbs and folding a winglet ninety degrees within a minute (for folding both upwards and downwards) was also a constraint. It is to be appreciated that SMT's were to be the driving force. Additionally, an advance over other contemplated embodiments, an integrated bias-spring capability for a return function was achieved. This meant that an ability to not require an external "return force" and integrating lock mechanisms within the envelope were obtained. For ease of reference, the embodiment so developed for this application may be called Winglet Actuator, and it will be clear from the context of the use of the term that a particular embodiment is being discussed. During the development of the Winglet Actuator, it was recognized that a single action from a single heating-cooling cycling of an SMT may not provide enough torsional force to achieve a ninety degree winglet movement, and that it would be more valuable to continue output motion in the same direction utilizing whatever twist angle an SMT capability may make available for a given volume (and other engineering selections) constraint. It is to be appreciated that the innovation is applicable to other implementations, and that alterations and various trade-offs are contemplated to be within the scope of the innovation.

It is to be appreciated that an aspect of the innovation is in the actuator Ring Drive system, while other aspects of the innovation may be presented in components of the actuator Ring Drive system, as will be discussed herein. It is also to be appreciated that the use of the term "Ring Drive" describes one or more embodiments, the details of which may be different in different embodiments, and may be used interchangeably with Ring Drive system, and in some contexts, "system." It is contemplated that the scope of the innovation includes alternatives of one or more aspects disclosed.

Ring Drive in accordance with this disclosure was in part innovated to provide an alternate mode to prior innovations, for example US Letters Patent 9885345 (herein "Calkins" or "Calkins' innovation"). Given a desire to combine a plurality of SMT's as a multiplier of rotational force, having a sun gear or center axis as the receiver of the multiplied force presented design issues related to material strength in most any such gear teeth of system elements. By innovatively focusing on an axially outward, or outbound (in relation to the plurality of SMT's), output driver, force exerted per tooth may be substantially lowered. It is to be appreciated that even with this reduction, to obtain a desired high torque output for this or other applications, design factors such as material (for example, fairly course, or high modulus gear teeth material, or very strong steel) or wider gears may be selected. It is to be appreciated that this innovative mode induced other changes in the system than the innovation as portrayed in prior systems. It is to be appreciated that "Ring Drive" may refer to the innovation in context of an actuator system or to components of an actuator system, and that the clarity may be obtained from the context of the use of the terms. It is also to be appreciated that aspects of the innovation may be applied outside of a Ring Drive.

Figure 1B:
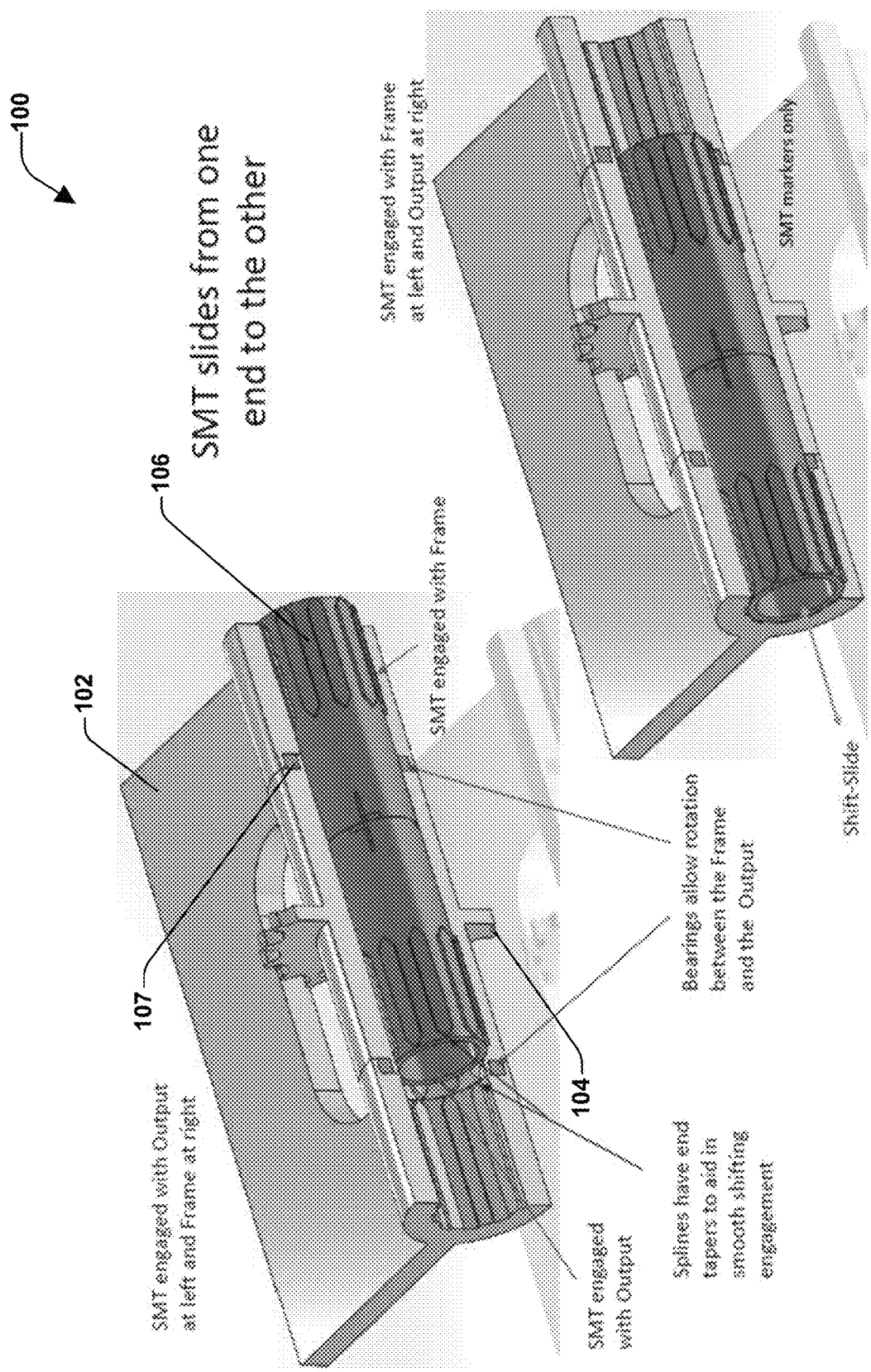
Figure 1C:
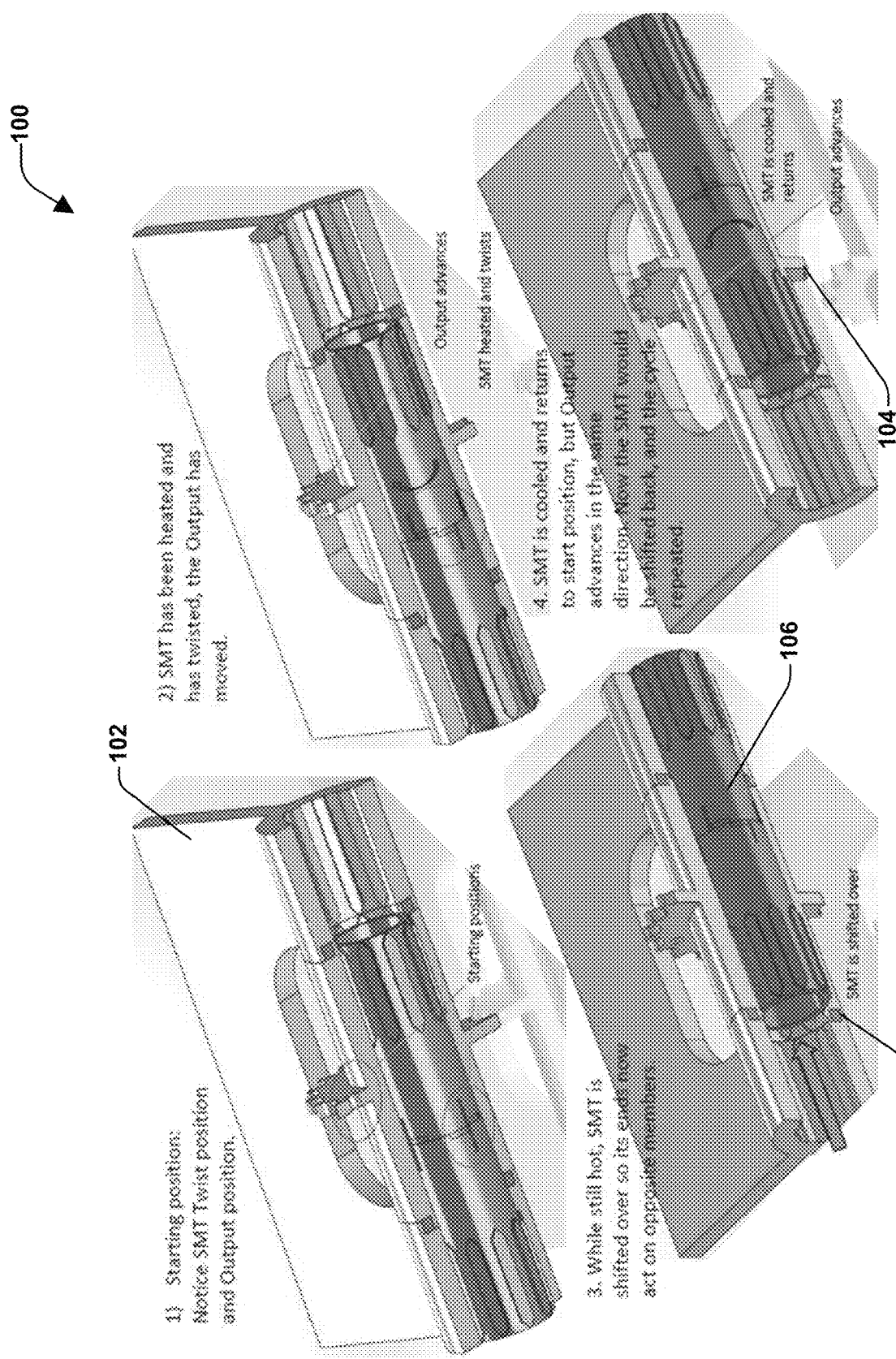

Turning briefly to FIGS. 1A-1C, an example component diagram of an application component is disclosed that provides an aspect of the innovation of reversibility, or to state this in another manner, providing for choosing continued load rotation in either direction of clockwise or counter-clockwise. It is to be appreciated that the embodiment presented is presented as a sliding tube for ease of discussion, but other physical arrangements are considered to fall within the scope of the innovation. In the aspect of reversibility, an innovative approach is taken with utilizing both ends of a SMT. FIGS. 1A-1C illustrate what may be called a Spline-Slide Actuator System 100. It is to be appreciated that the terms "slide" and "shift" are used interchangeably. As noted herein, Fixed (or Frame) and Output orientations may be selected for a particular application, and in embodiments, Output designation may be changed to Fixed and Fixed designation changed to Output. In the embodiment presented, the "Output" is a center, axial-rotating portion 104 while the Fixed (or Frame) is a majority structure 102. Note that this Frame 102 shows how attaching to a structural item between the actuator system's two ends may provide how a Ring Drive may put into effect its output torque. The SMT 106 is illustrated as being able to slide into splined engagement where its left end may be engaged with the Output portion 104 while its right end is engaged in the Frame, or it may be slid to the left such that its left end is engaged with the Frame 102 while its right end is engaged with the Output portion 104. The twisting motion of the SMT reflects the crystalline transformation, or the heating/cooling action of the SMT. FIGS. 1B and 1C illustrate four SMT positions and twists, showing how output motion in a same direction can be provided by a sequencing of SMT positions and twisting. Reversing the direction would be a simple matter in regards to the SMT position being opposite of what is illustrated during a same hot or cold cycling—in other words, a slide of the spline-slide actuator provides an aspect of reversibility, and for which aspect, the discussions of other embodiments (for other aspects) may be applied.

FIG. 1B illustrates an SMT slide from one end to another. SMT 106 may initially engaged with Frame 102 on a first side of the SMT 106. In such a slid position, the SMT 106 would be engaged with an Output 104 on its other side. It is to be appreciated that splines on the ends of SMT 106 may have tapers to aid in smooth shifting engagement, and mating splines may be provided at both ends of Frame 102. A shift-slide is shown with the SMT 106 engaging Frame 102 at another end while engaging Output 104 at an end opposite of its initial engaged end. It is to be appreciated that bearings 107 may allow rotation between the Frame 102 and Output 104.

FIG. 1C illustrates a sequence of slide-shift and heating for a thermal cycle application that provides relative movement between Frame 102 and Output 104. In a starting position, an initial state is of no twist. Subsequently, SMT 106 may be selectively heated and twists. As the SMT 106 is engaged with Frame 102 and Output 104 at different ends, the twist results in Output 104 advancing. Subsequently, while still at its heated temperature, SMT 106 may be shifted such that the engagement with both Frame 102 and Output 104 act on opposite members. During the next step of the thermal cycle, as SMT 106 is cooled, and returns to its initial untwisted state, the relative motion of the return twist advance Output 104 in the same direction as the prior advance. Thermal cycling may continue with Output 104 advancing in the selected direction. The direction of the Output 104 may be reversed upon reversing the steps and the heating/cooling operations shown in FIG. 1C.

It is to be appreciated that a Spline-Slide Actuator System 100 may comprise an element of a Ring Drive, or may operate on its own and that a plurality of Spline-Slide Actuator Systems 100 or a Ring Drive may utilize a plurality of SMT's to provide rotary motion in either direction, and indefinitely without reciprocating effects detracting from delivered output. This motion may not be ratcheted for one direction only; it may be firmly engaged in a rotational direction of choice. It is to be appreciated that for most any particular system arrangement, a limit on angular motion per thermal or heat/cool cycle of the plurality of SMT's may be present. For example, in the Winglet Actuator embodiment (with a particularly selected SMA), rotation was limited to be about 43 degrees before the system stopped its heat portion of the thermal cycle, locked the relative motion, freeing-up the SMT's to cool and retract, and then were re-engaged to continue the motion. This range may be determined for each particular application (including selection of various SMA), and does not limit the ability of the innovation to provide a continued torque in a selected direction, as disclosed herein. It is also to be appreciated that a determined rate of transformations of the SMT's (i.e., timing of a cycle of heating and cooling) may be provided for system design trade-offs. For example, in the Winglet Actuator, the system determined rate of transformation was sufficient to accomplish a 90 degree winglet rotation well within a desired 1-2 minute time window. It is to be appreciated that other embodiments may have elements selected so as to perform within desired time frames.

While various configurations may be made in view of the innovative aspects disclosed herein, for ease of presentation, embodiments of the system are disclosed in terms of a cylindrical system, with outputs at both ends, and either one end or the other being driven relative to a fixed element. It is expected that these ends may be attached to a common structure that will force them to move together, as for the example in the Winglet Actuator. It is to be appreciated that for convenience, the central portion of this device may be described as being "Fixed" or "Frame" while the two ends may be the "Output"; although functionally, these roles may be reversed. For clarity, the description will consistently portray one of these two roles. It is to be appreciated that while many actuator systems can utilize this design, in a Winglet Actuator, the fixed portion is attached to the wing and the output section is attached to the winglet, thus permitting relative motion therebetween. Other embodiments may provide for different relative fixed and output portions. It is to be appreciated that brackets for attaching the system may be located at various sections of the system, for example in an embodiment, brackets may be located at one or both of a Fixed and Output elements, and may be mounted on the outer diameter of the system, or may be integral to an outer casing (not shown). In an embodiment, brackets for the two fixed elements may be designed to attach to the corresponding brackets of a mating application, for example, in the wing structure of the Winglet Actuator. As will be discussed herein, a Ring Drive may engage with, or actuate, one Output bracket while another is free to move, and the two may swap roles depending on an operational sequence. It is to be appreciated that external structures that are to receive the actuator force are stiff enough to absorb torsional output. In an embodiment of Winglet Actuator, aircraft wings have an inherent torsional stiffness to withstand a required flight load and flutter resistance.

A Spline-Slide Actuator System 100 or Ring Drive may provide a wide variety of applications, and may be provided in a variety of instances in which rotary actuation is desired. It is to be appreciated that various application conditions may provide a variety of beneficial trade-offs such as for example power within a particular size envelope, or for another example, actuation in a desired reduced noise environment. The innovation not only provides continuous rotation in a chosen direction (with (or without) pauses), but also provides full muscle of a plurality of SMT's to the output, as it provides for an assisted return to the base state. The innovation is scalable, both in physical dimensions, as well as in the number of SMA elements that may operate in unison. The innovation may provide continued output rotation in a choice of either direction (clockwise CW or counter-clockwise CCW), or both at distinct times, and with the rotation/actuation/torque/power/load provided in the chosen direction. As noted, the output provided may not be strictly continuous, given that pauses may be present to allow for SMT transformation during a thermal cycle (the reciprocal nature not impacting delivered output due to the control of lock/unlock features, which will be discussed herein). This contrasts with prior innovations that are designed differently for strict continuous output, but with different modes of operation that are entailed therein. The innovation need not have the plurality of SMT's to be kept heated (at their temperature-induced transformation) to hold an actuation position because as will be discussed herein in relation to a Ring Drive embodiment, an output can be locked. As will be discussed herein in relation to FIGS. 5A-5E, aspects of the innovation in Tube Lock Design (TLD) may prevent motion in either direction as desired, as they are not one-way ratchets. In embodiments, a return assist mechanism (such as for example an internal torsion spring) may be incorporated to provide the torsional retraction bias force to the SMT's, eliminating a need for an external residual load.

During the conception and development of the innovation, the concept of a central sun drive core was discarded due to the limitation of how much force could be carried by gearing, specifically and for example, by the gear teeth for loading to a central output driver. It is to be appreciated that by switching to a non central load bearing core gear and instead using an innovative ring gear, that the force on the gear teeth at a wider diameter can be better managed.

Figure 2:
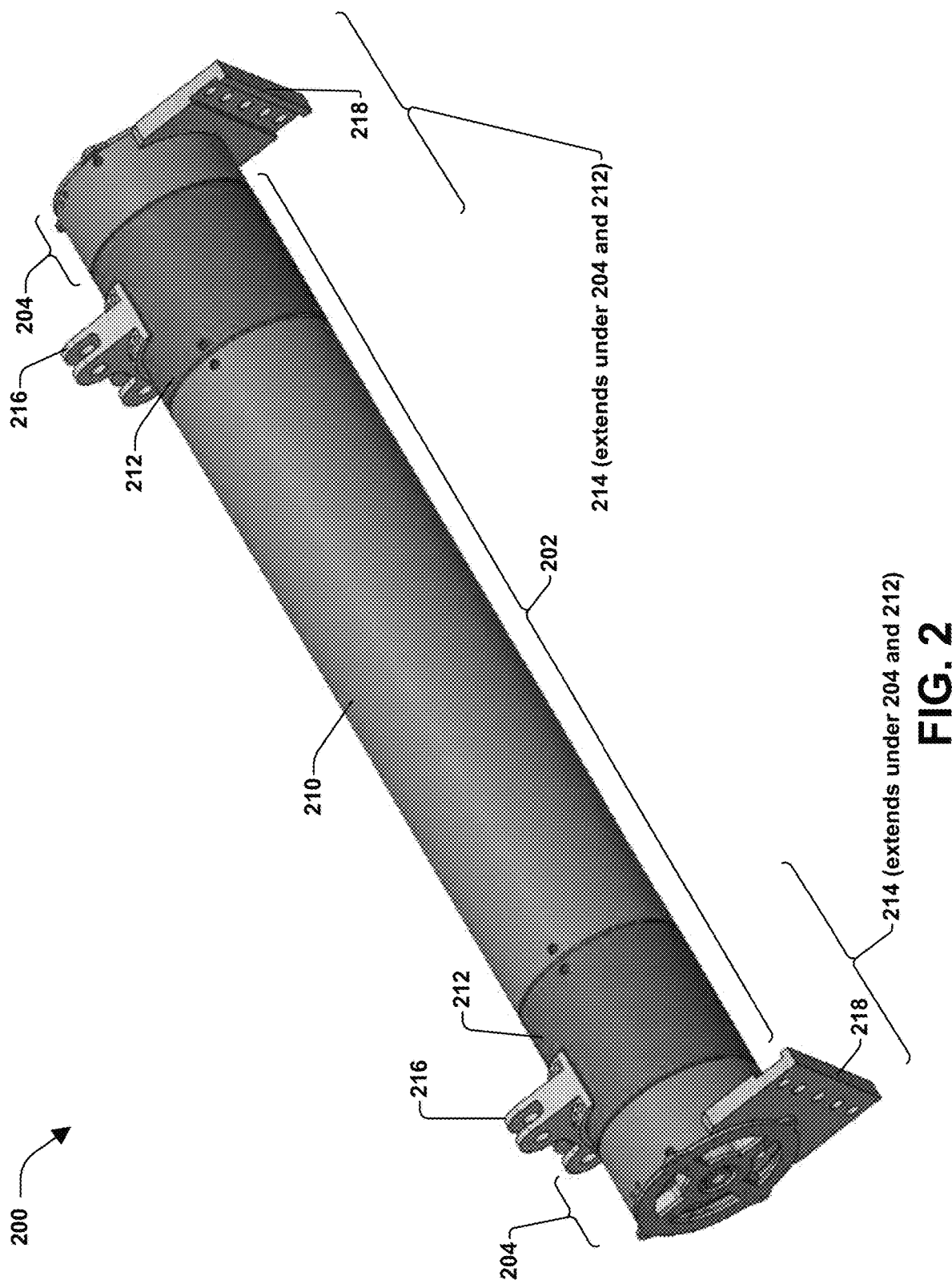
FIG. 2 illustrates an example component diagram of a Ring Drive system of the present innovation.

Turning briefly to FIG. 2, an example component diagram of a Ring Drive system 200 of an embodiment of the present innovation is portrayed. System 200 may comprise a central tube (or zone) 202, brackets 216, and a plurality of transmissions 214, which include a fixed grip tube section 212. The central zone may be comprised of a housing or Center Tube 210. In the embodiment of Ring Drive 200, the central zone combined with the Fixed Grip Tube portion of the transmissions are considered Fixed as discussed above in relation to FIG. 1. The output ends of the transmission (along with the output bracket) rotate relative to the fixed portion. Briefly, FIG. 2 introduces components and terms that present an embodiment of the innovation that provides relative motion (actuation) between portions of device that operate to transform a thermal cycle applied to a plurality of SMTs (such as for example an SMT 106) to a specified output force.

Figure 3:
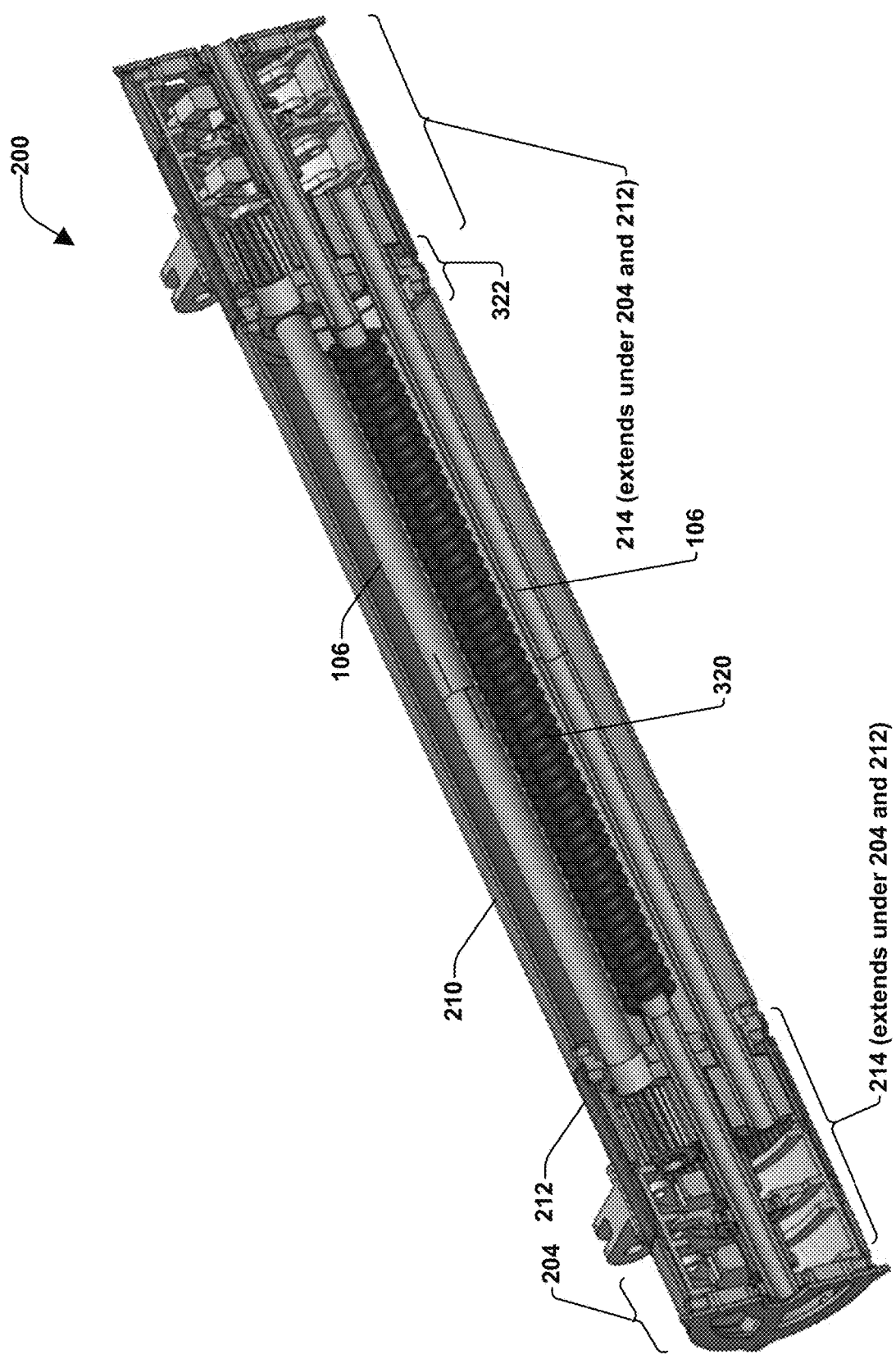
FIG. 3 illustrates an example component diagram of a Ring Drive system of the present innovation.

Turning to FIG. 3, an example cross section of a component diagram of the Ring Drive system 200 of the present innovation is portrayed. The example cross section illustrates components of system 200 that include portions inside of a center tube 210, such as SMT's 106 and a return assist mechanism 320 (in this example, a bias torsion spring), as well as other system components such as a carriage feature 322 (which may comprise SMT bearings—not shown) and a plurality of transmissions 214. Not shown, but will be discussed herein, are SMT thermal cycling elements, for example, induction heating wire wraps that may be provided for each SMT. Individual elements will be discussed in detail herein.

Recapping the above, a system as portrayed in the above example diagrams, a system, such as system 200 provides an embodiment that may comprise a plurality of SMT's 106, which may be oriented parallel to each other and spaced about a central axis of the system. In an embodiment, the plurality of SMT's 106 are supported by sleeve bearings (as will be discussed in relation to FIGS. 4A-4C) set in a common carriage 322, which may be located at each of both ends of an example system. Center Tube 210 houses a central zone and may have an outside diameter of the final device (for example, in one embodiment of Winglet Actuator, a diameter of 4.5"). Center Tube 210 may be attached to the Carriages 322 at both ends with pull-out dowel pins (dowel pins with a threaded hole at one end that allows them to be pulled out as needed), or as may otherwise be known in the art (not shown).

Not shown, a provision for thermal cycling may be provided for heating the SMTs and reside within Center Tube 210. Heating may be achieved by a variety of manners, such as for example, by an induction coil, which may be a continuous coil of insulated wire wrapped around an outer diameter of each SMT 106. Inductive heating of the SMT 106 may be caused by passing an electrical current through the coil. The coil may be made from a variety of materials as may be known in the art, and an example embodiment features a 0.21 inch diameter wire with insulation, however, other wire diameters may be utilized. A wire may be tubular to allow the flow of a coolant to control the wire temperature. SMT's 106 may be cooled with the use of forced ambient air through the ends of the complete assembly (in one end and out the other, and through openings along the elements of the system. It is to be appreciated that alternative methods of heating and cooling are envisioned. For example, hot air may be used to flow through passages to heat the SMT's 106 in addition to or in placement of using induction coils, with a switch over to ambient air for cooling. Certain applications may have provisions made to mount electrical-equipment cooling fans (not shown), for example at both ends of the system to force airflow. Additionally or alternatively, SMT's 106 with pre-planned water tubes or passages (not shown) may be used for heating and cooling. The Components briefly set out in FIG. 3 will be discussed in more detail herein.

Figure 4A:
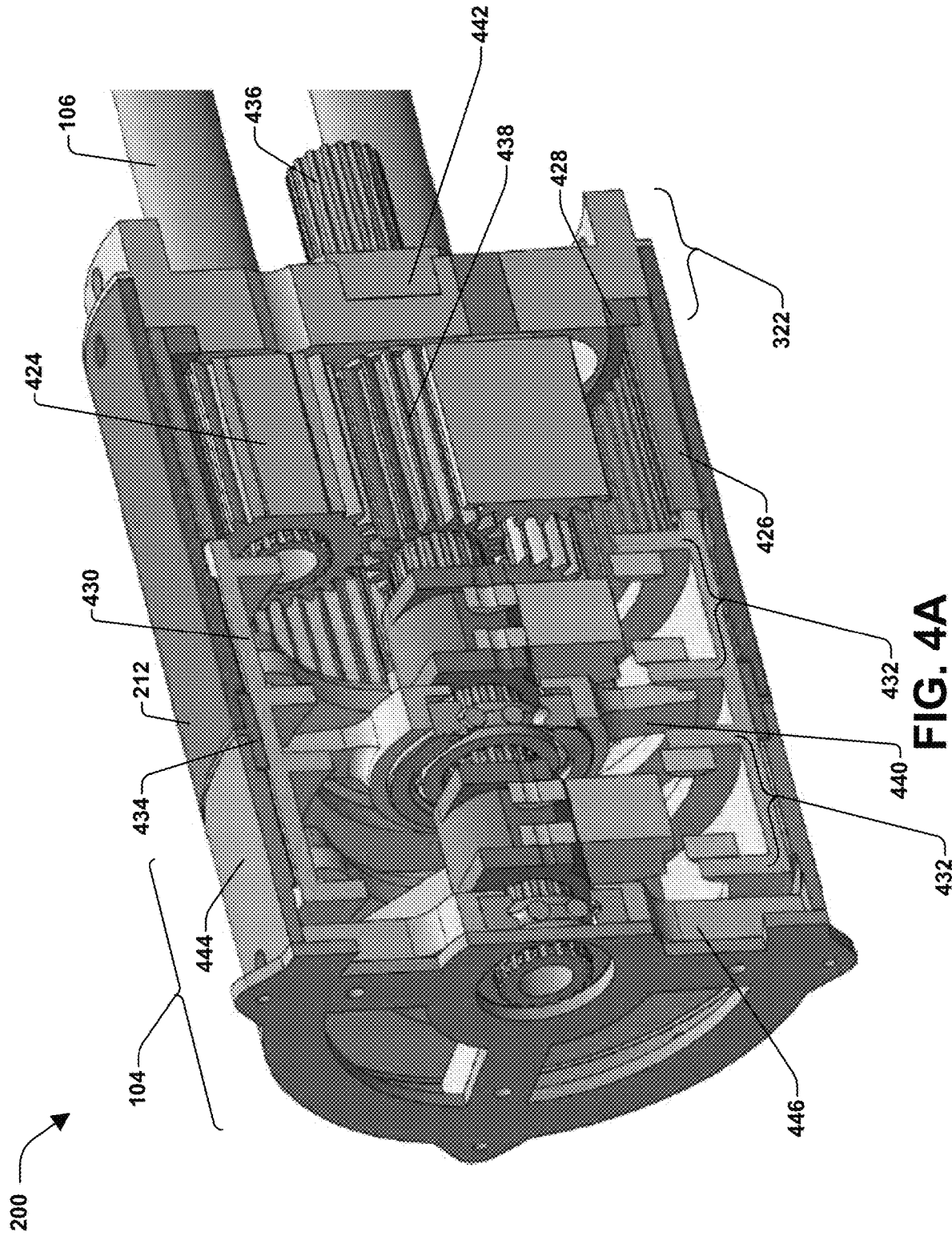
FIGS. 4A-4C illustrate an example detailed sub-component diagram of a set of application components.
Figure 4B:
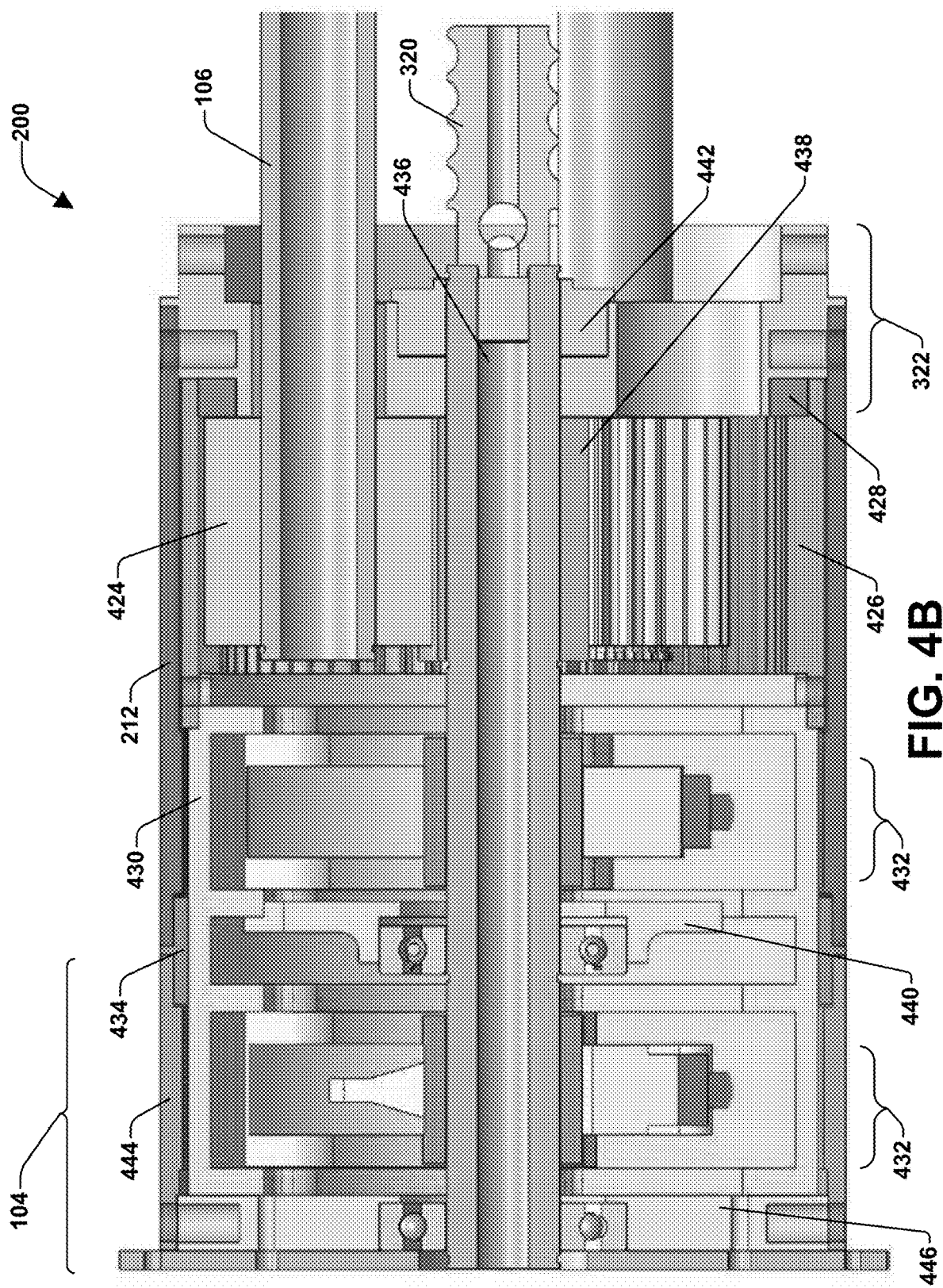
Figure 4C:
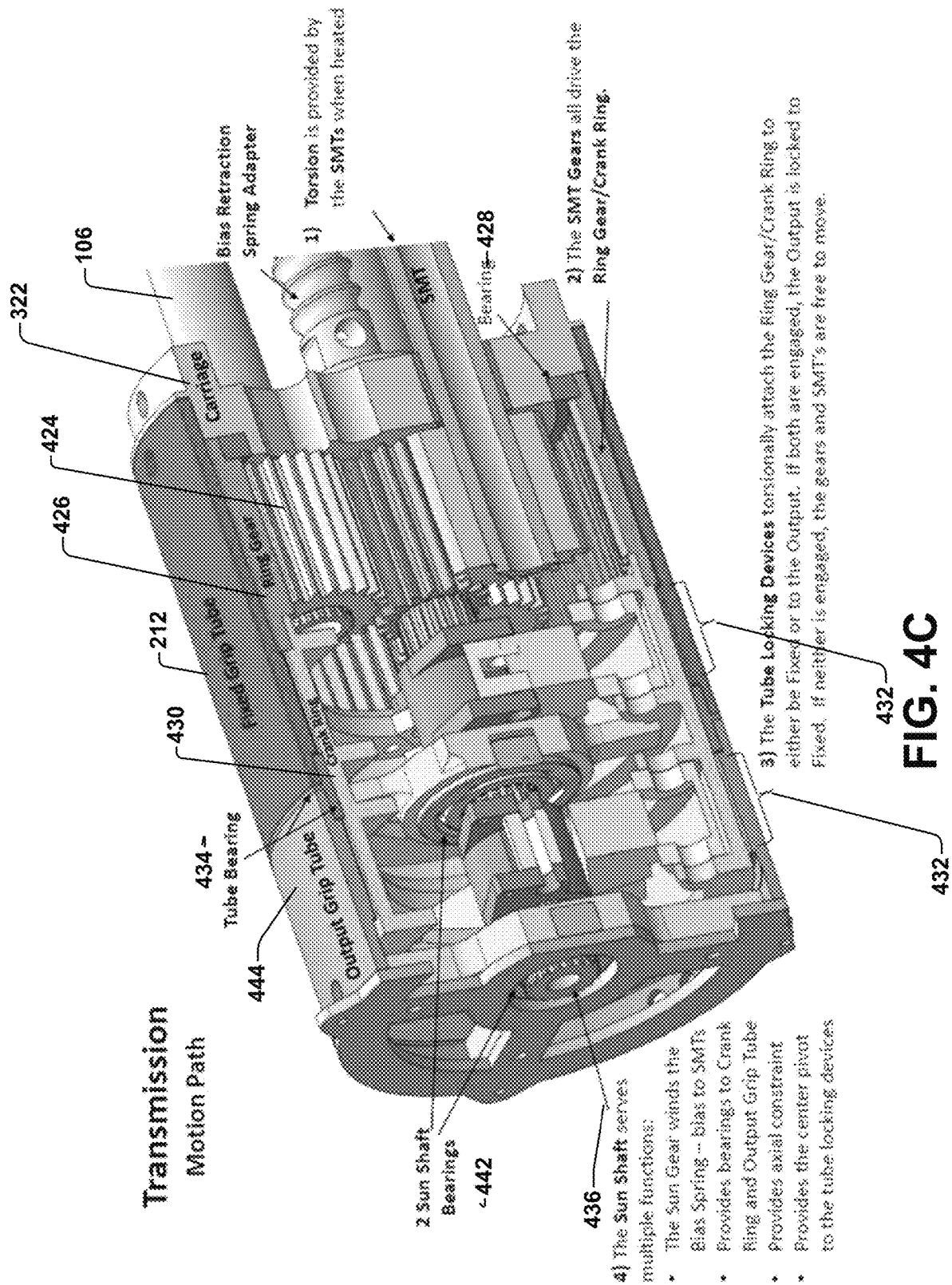

Turning to FIGS. 4A-4C, an example sub-component diagram of a set of application components providing detail of system 200 is portrayed. It is to be appreciated that in one or more embodiments, Transmission 214 at each end of a Ring Drive 200 may be identically configured and mechanically work the same, acting in concert with each other to affect the output 104. Transmission 214 may feature SMT planetary gears 424 that are affixed to both ends of each SMT 106 and reside adjacent to Carriages 322. Enough axial space and gear teeth engagement is provided for thermal lengthwise growth of each SMT 106 during operation. It is to be appreciated that in an alternate embodiment as described above in relation to FIGS. 1A-1C, SMT 106 and associated gearing may disengage one side or another of a system. A Ring Gear 426 may be mounted on a Ring Gear Bearing 428, which is a large-diameter ball bearing seated on the Carriage 322. It is to be appreciated that the Ring Gear 426 is engaged with the gears of all (or most all) of the plurality of SMT planetary gears 424, thus enabling the plurality of SMT's 106 to act together such that their power and motion may be multiplied into the Ring Drive 200. As has been noted, in contrast to prior innovations, by configuring the force of the multiplied plurality of SMT's 106 to be directed outbound to an outer Ring Gear 426 (primary output) as opposed to inwardly to an axial Sun Gear 438, the load force is better managed, providing for system durability and more efficient engineering sizing trade-offs. In an embodiment, Ring Gear 426 may be attached to a Crank Ring 430 by a lip and pins, or other techniques as may be known in the art. The Crank Ring 430 may be a cylindrical shaped part that supports two identical Tube-Locking Devices (herein TLD) 432 (to be described later). Fixed Grip Tube 212 houses the Ring Gear 426 and Crank Ring 430 and may be attached to the Carriage 322 (for example, the attachment may be pinned-on in the same way the Center Tube 210 is attached in an embodiment). It is to be appreciated that the attachment may provide a structural extension of the Center Tube 210 not shown). At the end of the Fixed Grip Tube 212, and between its inner diameter and the Crank Ring 430 outer diameter, is a ring-shaped Tube Bearing 434 which may be made of a solid bearing material such as oil-impregnated bronze. This may provide bearing support from the Fixed Grip Tube 212 to the Crank Ring 430.

Also within the Center Tube 210 may be a return assist mechanism 518 not shown in FIG. 4A, partially shown in FIGS. 4B and 4C), such as a Bias Torsion Spring, which may be a single spring to provide the bias retraction torque to the plurality of SMT's 106. A return assist mechanism 518 may be at the center of the Central Tube 210, located at the axis of the system. In an embodiment, the return assist mechanism 518 would be attached at both of its ends to a pair of Sun Shafts 436 that also would be centered axially among the SMT's 106 and may be driven by a Sun Gear 438. The Sun Gear 438 may be in engagement with all (or most all) of the SMT Planetary Gears 424 (as shown) or in engagement with the SMT's through the Ring Gear 426 (not shown). It is to be appreciated that the teeth of the Sun Gear 438 need not be designed to carry the load that is the output load from the Ring Gear 426 to the output. One purpose of the Sun Gear 438 and Sun Shaft 436 is to convey a torsion from a Bias Torsion Spring of the return assist mechanism 518 in the Central Tube 210 (that bridges between the two Sun Shafts) to the SMT's 106. As will be discussed herein in an example operating method later, while the SMT's 106 are being heated, a portion of the force is directed to the Sun Shaft 436 that would drive and wind-up (add torsion) to a Bias Torsion Spring. In a cooling phase of the SMT's 106, the return assist mechanism 518 then, through the Sun Gear 438, may provide a bias torque to the SMT's 106 to return them to their cold starting state. It is to be appreciated that this return mechanism prevents a conventional "walking" of an SMT 106 that otherwise may occur in a clutch or sprag locking technique. Additionally or alternatively, a Bias Torsion Spring may be pre-wound during assembly so that there is most always a bias torque being applied to the SMT's 106 whether they are cold or hot. It is to be appreciated that the force of the assisting reverse bias torque is appreciably less than the force of the generated torsional power of the SMT 106 during the heating phase and operates in the cooling phase at which time the torsional power of the SMT is relatively weak.

The Sun Shaft 436 may be centrally supported by the Crank Ring Mechanism 440 (bearing and retainer), which may be supported through the Tube Bearing 434 by the Fixed Grip Tube 212 and by a center Sun Shaft (ball) Bearing 442 in the Carriage 322. In this manner, the support of the Sun Shaft 436 also helps support the Output Grip Tube 444 through the Output Bearing Mechanism 446. The Output Bearing Mechanism 446 may be combined with the other lip of the Tube Bearing 434 (discussed above) to support the Output Grip Tube 444.

The Sun Shaft 436 may also serve several additional functions (pictured, but not called out for clarity in FIG. 4A). A retaining ring (not shown) in the Central Tube 210 side of the Carriage 322 residing against the Sun Shaft Bearing 442 may prevent the Sun Shaft 436 from being pulled out. In an embodiment, adding a wave disc spring and a retaining ring (not shown) on the Shaft 436 at the Crank Ring Bearing (within 440) may capture an amount of axial force and serve to retain the Ring Gear 426 onto the Ring Gear Bearing 428 of the Carriage 322. The Sun Shaft 436 may similarly hold the Output Grip Tube 444 on, and with, at the very end of the transmission, having a wave disc spring (not shown) between the Output Tube Bearing and a retaining ring (within 446), may provide some axial force to the Output Grip Tube 444.

In an embodiment, the Carriage 322 may be made of oil impregnated bronze (for example Oilite) so that most all the SMT 106 and Sun Shaft 436 holes would act as bearings. In another embodiment, the Carriage 322 may be made of a strong structural material, for example 17-4 PH stainless steel. In such an embodiment, holes may be enlarged to accept Oilite bushings (not shown) for the SMT's 106. It is to be appreciated that due to the heating of the SMT's 106, a high temperature bushing (for example, McM 9368T72) may be used.

The Sun Shaft 436 may also provide a central pivot point for all (or most all) of the TLD 432—as will be described herein. It is to be appreciated though that the driven twisting of the Sun Shaft 436 does not affect the functioning of the TLD 432.

It is to be appreciated that weight saving of various components such as for example the Carriage 322 may be obtained, trading off choices of perhaps weightier and stronger material with providing selective recesses (not shown).

To briefly restate the above, embodiments of the innovation provide that a pair of Sun Shafts 436 may drive/wind a return assist mechanism 518 (such as for example, a bias torsion spring), which conveys a bias torsion to the SMT's 106. Cantilevered ends of the Sun Shaft 436 may provide support to the Output Bearing (within 446), and therefore, assist in supporting the Output Grip Tube 444. A pair of Sun Shafts 436 also with a retaining ring and wave disc spring (not shown), may provide axial retention of the Crank Ring 430/Ring Gear 426 onto its bearings, and similarly, may provide axial retention to the Output Grip Tube 444, as well as provide central pivoting for both TLD 432.

In an embodiment, a ball bearing at the Sun Shaft center hole may be provided primarily so that the thrust being carried through this shaft that will hold on the Ring Gear assembly will have less friction. It is to be appreciated that a particular application may be provided based on sizing considerations. For example, in the discussed embodiment of Winglet Actuator, a flanged ball bearing was selected based in part on envelope considerations (in an embodiment, the ball bearing may have a 1⅜ inch outer diameter).

It is to be appreciated that the terminology herein should not be confused in that although an axial gear and shaft are called "Sun", they serve a different purpose from a 'typical' planetary gear drive (as may be represented by most prior implementations). It is to be appreciated that the Sun Gear and Shaft are not functioning as a part of a transmission in the way that a planetary gear drive normally may be utilized.

The motion transmission path is graphically shown and labeled as in FIG. 4C. As disclosed herein, output torsion may be provided with heating SMT's 106 during a thermal cycle. It is to be appreciated that amount of twist (force and angular displacement) may be varied by selective engineering design choices. The torsion generated from the SMT's 106 is largely transferred through SMT gears 424 to drive the Ring Gear 426 and Crank Gear Mechanism 440. Selective control of a plurality of TLD 432 torsionally attach the Ring Gear 426 and Crank Gear Mechanism 440 to either the Fixed 202 or Output 204. It is to be appreciated that in an embodiment, if both Ring Gear 426 and Crank Gear Mechanism 440 are engaged, the Output 204 may be locked to Fixed 202. If neither Ring Gear 426 nor Crank Gear Mechanism 440 are engaged, they and the SMT's 106 are free to move (rotate). It is further to be appreciated that Sun Shaft 436 may serve one or more of multiple functions for various embodiments, including providing a winding force to a return assist mechanism 518, provide bearing support to a Crank Ring Mechanism 440 and Output Grip Tube 444, provide axial constraint, and provide a center pivot for TLD 432 (as will be discussed herein).

In an embodiment, each of a set of two transmission elements 214 comprises a pair of TLDs 432. As shown in the embodiments in the series of FIGS. 5A through 5E (to be discussed herein), there may be a plurality of transmission elements 214 at each end of a system 200. As disclosed, the transmission 214 is at the juncture of a driving force of the plurality of SMTs 106 and the Output 204. A transmission 214 may have a pair of TLDs 432. A purpose of the set of TLDs 432 in each transmission 214 is to selectively lock, or unlock, a rotary motion of a Crank Ring 430 to a Fixed Grip Tube 212 for one, or to an Output Grip Tube 444 for the other (components as related to prior discussions herein). The pair of TLDs 432 may generally be located next to each other—separated for example by space for the Sun Shaft Bearing 442 and Tube Bearing 434. Since in a pair of transmissions 214, each of four of the TLDs 432 may be identical, only one TLD 432 need-be described here, as follows.

As shown in FIGS. 5A-5D, pivoted between flanges (not shown) of the Crank Ring 430 are two Pawls 548 that reside opposite from one another. Each Pawl 548 has teeth that may mesh with the teeth on the inside of either the Fixed Grip Tube 212 or the Output Grip Tube 444 (for ease of clarity only one is shown). Openings through the wall of the Crank Ring 430, called Pawl Windows 550, allows for this interaction. Moving the Pawls 548 outward engages the teeth and causes a locking-action, while retraction results in unlocking. It is to be appreciated that a proportional push-out force on a Pawl 548 occurs when a Pawl 548 is engaged and there is relative torque between it and the teeth of the Fixed Grip Tube 212. This is due to a ramping effect of the teeth profile design (which is discussed herein). In each TLD 432, both Pawls 548 move in a coordinated manner and serve together to create the function by moving together and opposite from one another. This is accomplished by a Lock Knuckle 552 on the centrally located Sun Shaft 436 and Lock Knuckle Links 554 from the Lock Knuckle 552 to each Pawl 548. When the Links 554 are positioned straight-across relative to each other with their pivots in alignment, this alignment forms a structural column (with both modes shown in FIG. 5B) and provides a locking mechanism for the transmission. When locked, relative motion of a Crank Ring 430 to either of a Fixed Grip Tube 212 or an Output Grip Tube 444 is prevented. It is to be appreciated that an innovative aspect comes from the torque-reactive push-out force of the Pawls 548 that is carried straight across the Links 554 in the column orientation, as in this alignment no force is needed to keep the Links 554 in the locked position. It is also to be appreciated that the ends of the Links 554 can be designed to butt-up against features of both the Pawls 548 and the Lock Knuckle 552 such that this column force is carried through this contact, and the force is not solely carried through pivoting pins (not shown). In the embodiment, a flat-feature on the Lock Knuckle 552 at the location where the Links 554 pivot assists in preventing the Links 554 from over-rotating past the straight and locked position.

Actuation of this Pawl locking device may be accomplished in a number of manners. In an example embodiment, actuation may be accomplished with a small Linear Actuator 556 which has pivot points at each end, such as may be known in the art. In the Winglet Actuator embodiment, a 12 volt actuator provides a maximum built-in gear reduction for its body type of 210:1, and that provides a maximum force of 18 lbs. and a stroke of 0.39 in. The piston end of the Actuator 556 may pivot to an arm off of the Actuated Link 554 while the other end of the Actuator 556 may pivot from a mid-positon point on one of the Pawls 548. Expanding the linear actuator 556 causes rotation of the Actuated link 554 at one end while pushing directly out on the Pawl 548 at the other end. This causes both the Knuckle Link 554 and the Pawls 548 to rotate into their locked, straight-across positions. It is to be appreciated that the linear actuator is not particularly powerful, nor need it be. This is because the teeth may be aligned before a full lock can be expected, and is not forced. It is also to be appreciated that in this embodiment, the Linear Actuator 556 may reside in the same plane as the other locking device components, thus providing for minimizing an overall width of the TLD 432 (and thus, of the Transmission 214). With this minimization of the total length of each Transmission 214, and typically given a spatial constraint of a limited length availability of an overall system, reducing the width of the TLD 432 provides for a greater length of a Central Tube 210 and associated SMT's 106 may be maximized. The longer the SMT's 106, the more output twisting motion may be available.

Figure 5A:
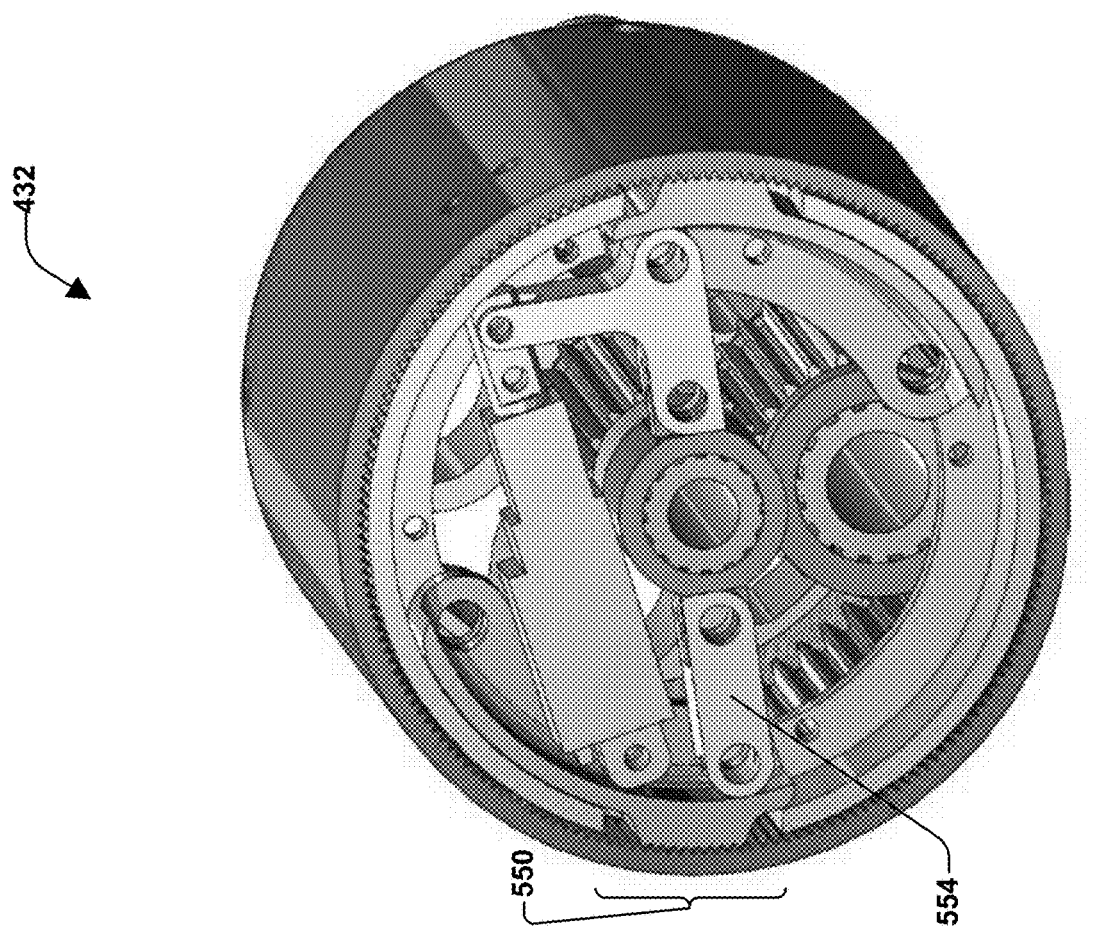
FIGS. 5A-5E illustrate an example component diagram of an aspect of the innovation.
Figure 5A:
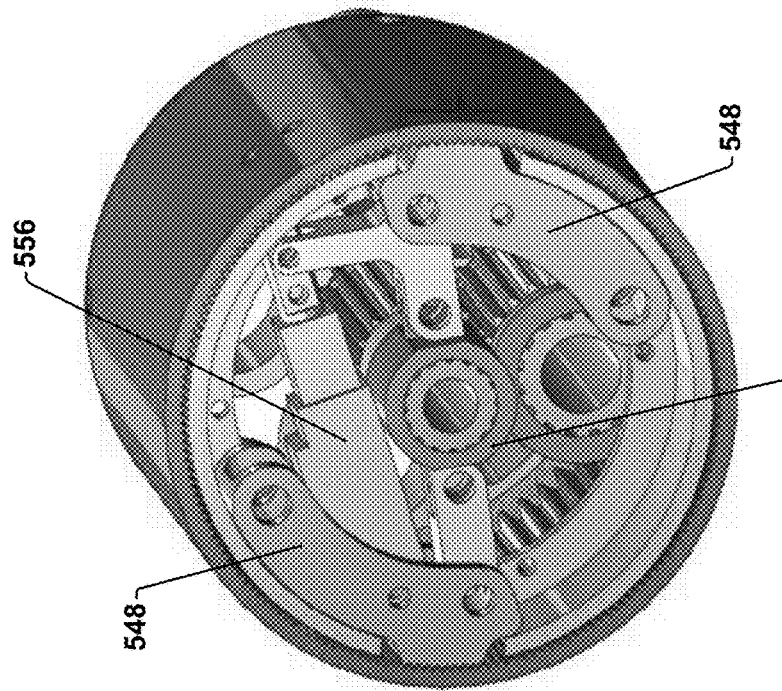
Figure 5B:
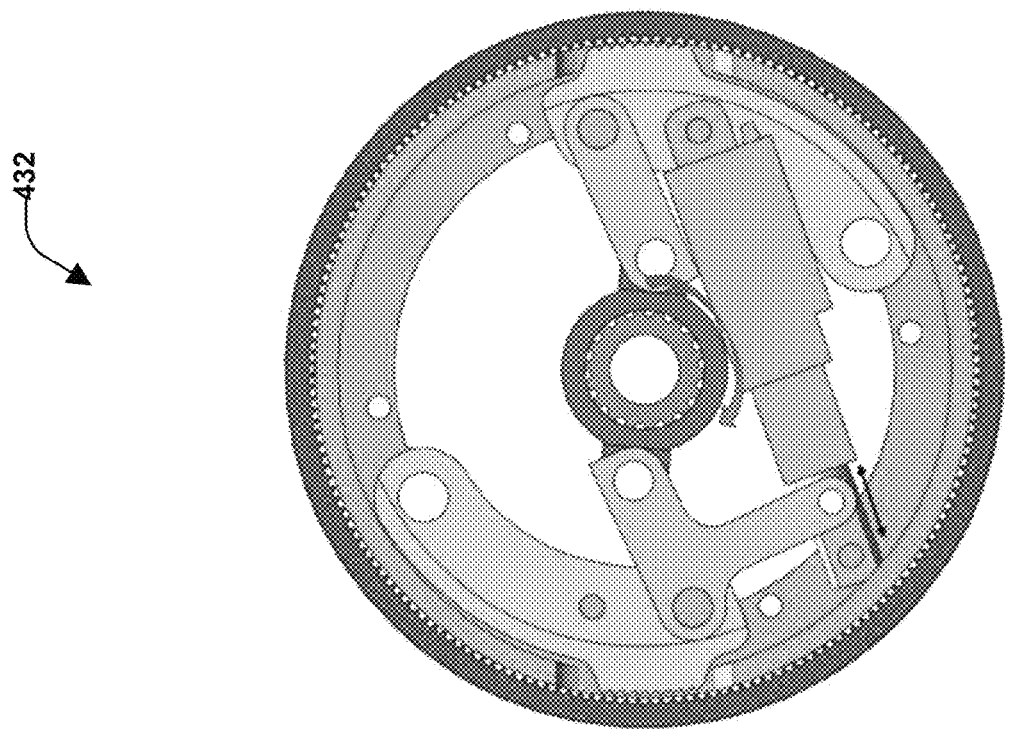
Figure 5B:
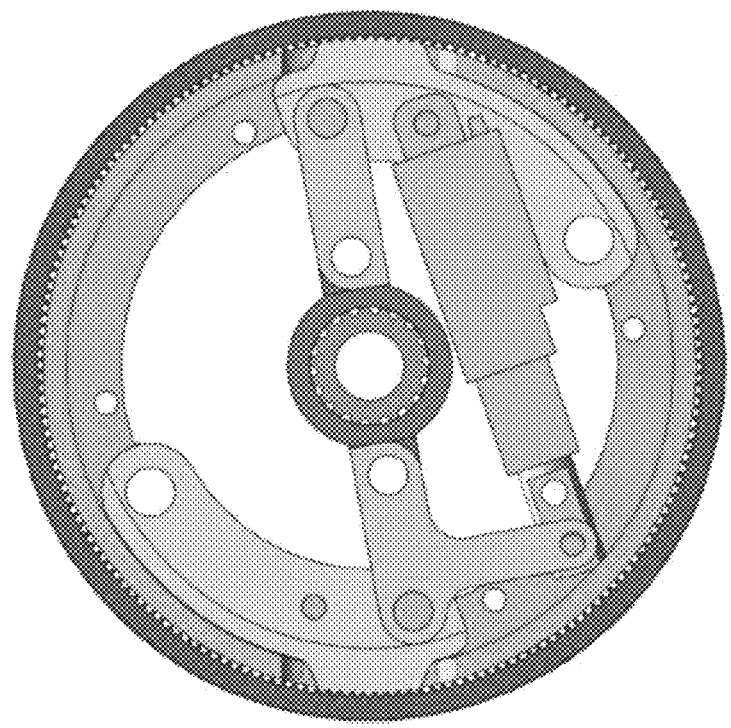
Figure 5C:
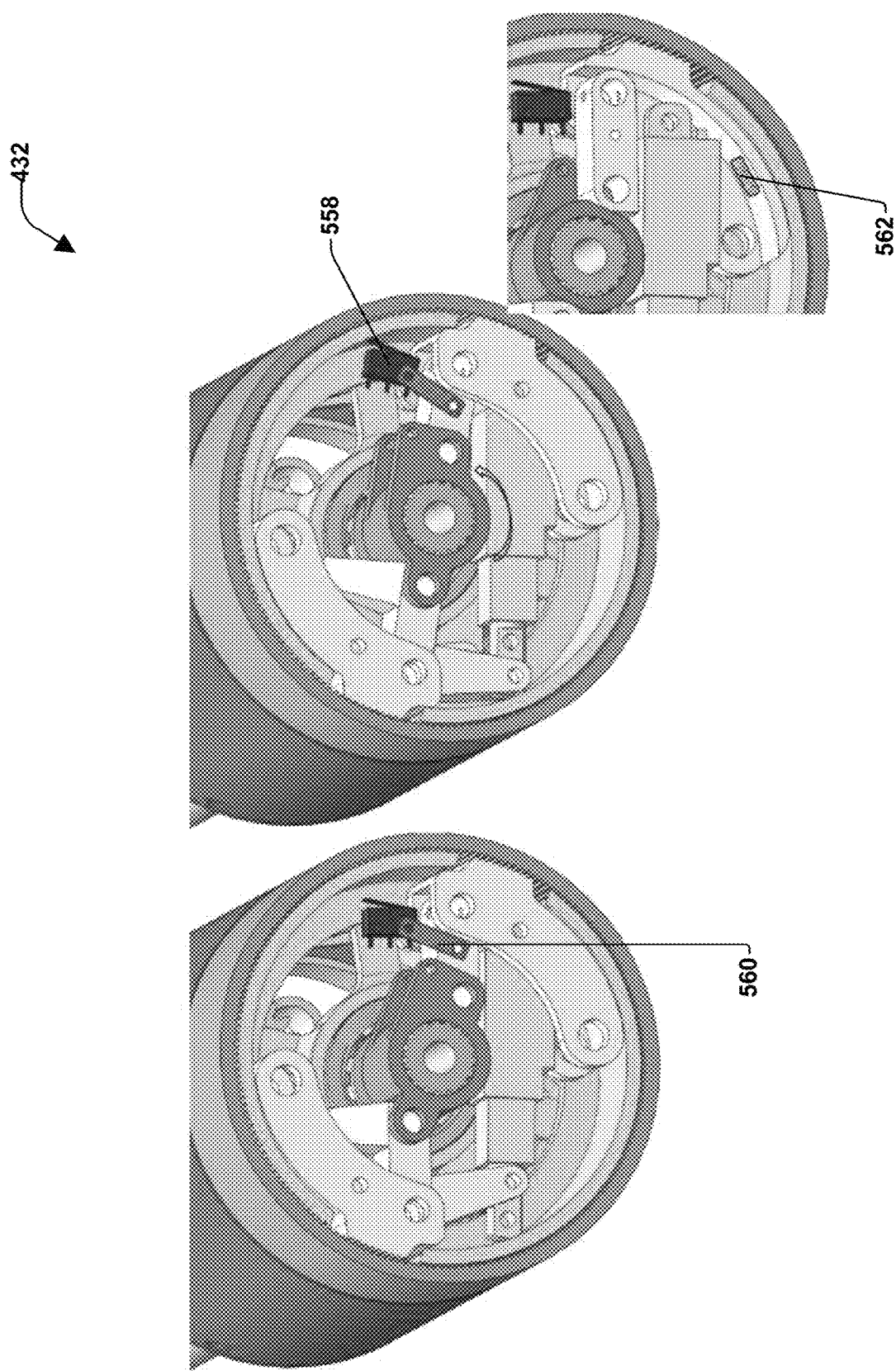

In an embodiment, sensors may be included in the system (example sensors and placement shown in FIG. 5C). Sensors may provide for control of the locking and unlocking functions. A sensor may be used to sense whether pawls 548 of the TLD 432 have sufficiently engaged. For example, a simple small micro-switch 556 may be mounted with a switch bracket 558 between a non-actuated link 554 and a Crank Ring 430 such that as the Link 554 rotates into the Pawl (548)-engaged position, the switch 556 would be pushed (no contact/contact with a wall may be seen in the views). Another sensor 562 may indicate how much torque is being applied between a Pawl 548 and a Fixed Grip Tube 212 when engaged. For example, a strain gauge may be mounted in a valley surface of a Pawl 548 and may provide data for control purposes. Alternatively or additionally, yet another sensor (not shown) may be provided to monitor a relative rotational position of the TLDs 432 to the teeth of the Fixed Grip Tube 212 so that when alignment occurs, the TLD 432 can be engaged.

Figure 5D:
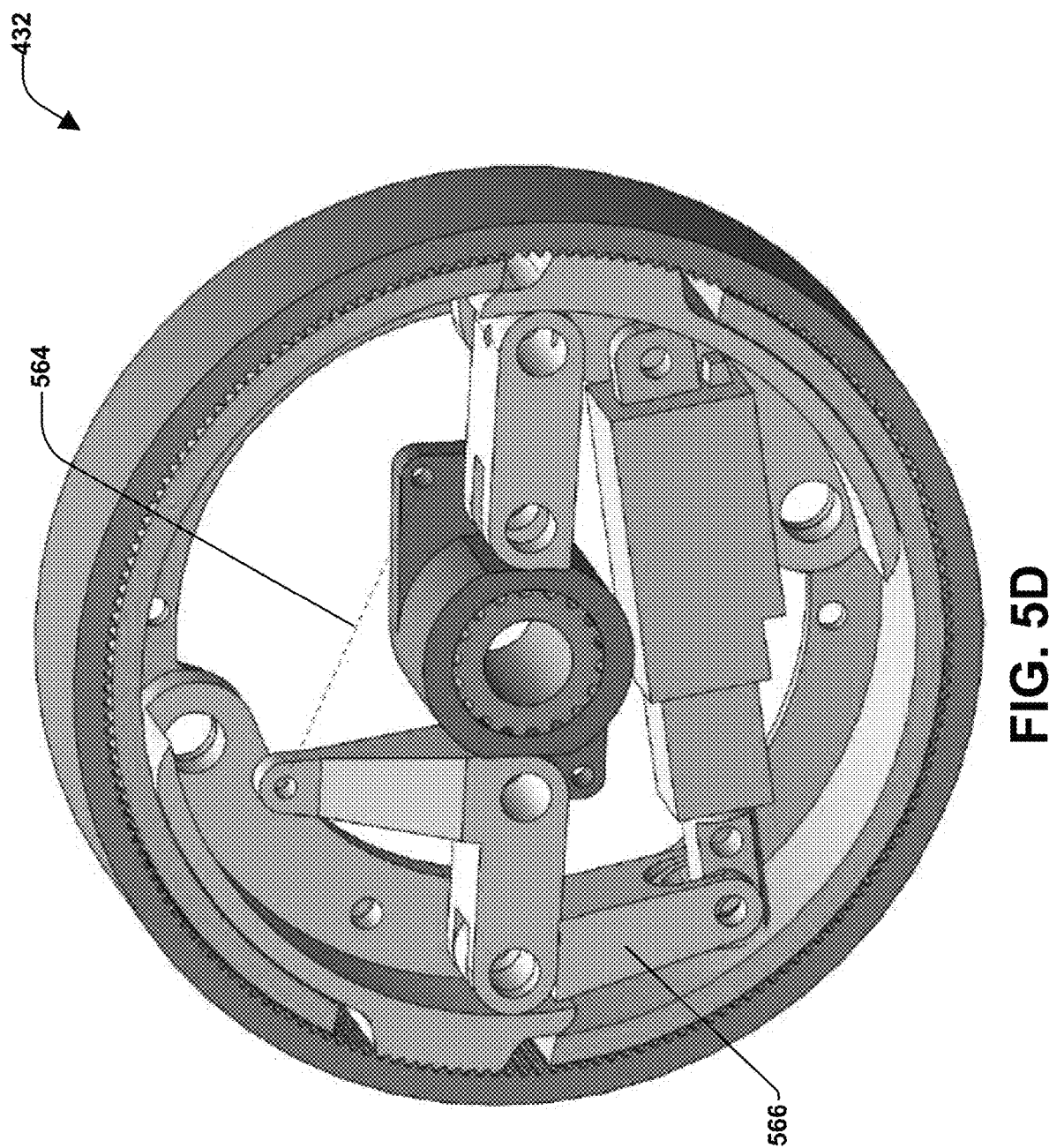

In another embodiment as shown in FIG. 5D, an alternative aspect of a TLD 432 is presented. In this embodiment, alignment concerns of Fixed Grip Tube 212 and teeth of Pawl 548 may be alleviated. It is to be appreciated that much power need not be available from a Linear Actuator 556. In other words, a Linear Actuator 556 may not force teeth of the mating components into engagement if the items are not aligned. It is to be appreciated that in most operational sequences, there will be the opportunity to cause alignment of the Fixed Grip Tube 212 to the Pawls 548 to allow for a low-force engagement. In view of the subject innovation, for example, this result is possible with the use of positional sensing, as noted above. Another aspect is that it may be desirable to provide an opportunity to unload (torsionally) a Fixed Grip Tube 212 from a Pawl 548 before disengaging.

In an embodiment that alleviates a presence of a highly coordinated operational system including load sensors, an embodiment with a spring-loaded version of the TLD (designated TLD-S) may be configured. It is to be appreciated that the basic mechanism of Pawls 548 and Links 554 are as discussed above: The Lock Knuckle 552 still may be twisted to align the Links 554 and the Pawls 548 for locked-in engagement. In this embodiment, a tension spring 564 between a Disengage/Spring Link 566 and a modified Lock knuckle 552 provides an ever present twisting force trying to twist the Lock Knuckle 552 and push the Pawls 548 into engagement. In another embodiment, a Linear Actuator 556 may be connected to a Disengage/Spring Link 566 such that when the actuator 556 is retracted, a shoulder on the Disengage/Spring Link 566 pushes and holds the links and Pawls 548 out of engagement against the spring force. When the actuator 556 is extended, it allows engagement of the Pawls 548 that are then being pushed into the teeth of the Fixed Grip Tubes 212 by the spring 564. When the teeth become aligned, the Pawls 548 will sufficiently self-seat into engagement. Furthermore, when the actuator 556 yanks the Pawls 548 out of engagement, if there remains some residual load torque on the output, the Disengage/Spring Link 566 will allow the Pawls 548 and other links 554, 566 to pop-out against the spring tension and thereby protect the actuator 556 from a momentary overload. This embodiment provides an advantage of facilitating ease of control-sequencing of both locking and unlocking.

Figure 5E:
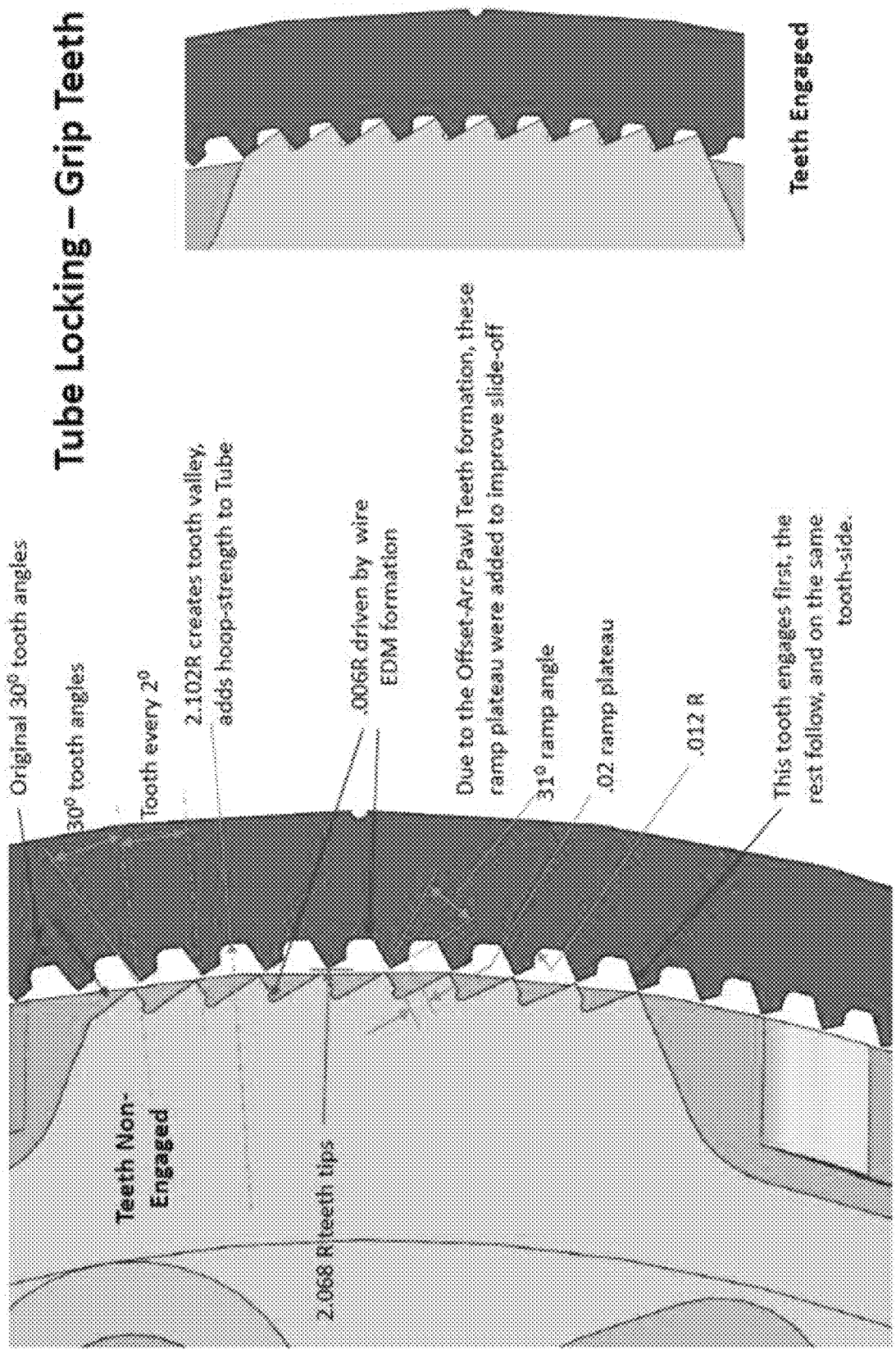

Turning to FIG. 5E, another aspect of the embodiment of Winglet Actuator that provided insight was developed in the teeth design for the Fixed Grip Tube 212 is illustrated. For this embodiment, it was decided early in the design process that the engagement motion of the Pawls 548 to the inside teeth would be based mainly on a hinged motion, rather than purely on a linear motion. This was chosen for the sake of mechanism simplicity and reliability, as accommodating a purely linear motion may entail having linear devices in configurations that can be complex and vulnerable to jamming or other unpredictable behavior.

An initial consideration was for the teeth on the inside of each Fixed Grip Tube 212 to be formed by 30 degree angles. Then selecting the number of teeth may determine angular spacing (for example, for a given application envelope consideration), and what depth they may occupy. For this embodiment, the number selected was 180 teeth (after consideration of a range of teeth) which therefore provides an angular resolution of 2 degrees. A teeth tip diameter of 4.136 inches provides valleys of depth that provide adequate structural wall thickness to the Fixed Grip Tube 212. Most all of these selections are variables of the design that may be driven by particular applications, and thus should be understood as to not be limiting to the innovation. It is to be appreciated that for different applications, alterations may reflect aspects of the innovation.

It is also to be appreciated that a choice of fabrication process may interact with the design aspects. For example, returning to the fabrication processes chosen for the embodiment under discussion, an alteration to the profile of the teeth of the Fixed Grip Tube 212 was made in view of the fabrication process of wire EDM (electrical discharge machining). Other fabrication processes may be chosen, but for the embodiment under discussion, wire EDM was selected due to factors such as accuracy of cut and automation-capability. Due to the common use of 0.010 inch diameter wire for EDM cutting, fillets were included in the valleys of all the teeth of 0.006 inch radius (0.005 inch wire radius+0.001 inch scatter-removed metal).

It is to be appreciated that other system components may provide aspects for additional modifications, for example, in the presently discussed embodiment, there were two additional Grip Tube teeth profile modifications. One derived from considerations of Offset-Arc Pawl teeth, which provided a Pawl Teeth configuration that was shortened and ramped. For the embodiment to add strength to a Fixed Grip Tube 212 for the shortened configuration, valleys of the Grip Teeth were filled in to a floor of radius 2.102 inches. Ramped plateaus were added to each tooth to improve the sliding action with the Pawl Teeth. It is to be appreciated that this feature provides an orientation of the Pawl 548 to the Fixed Grip Tube 212 to be uni-directional.

Turning now to FIGS. 6A-6E, the functionality and device of a TLD 432 is illustrated. With a discussion of methods of providing controlled rotary output with the use of a plurality of SMA in the shape of SMT, several aspects of the innovation are introduced and discussed. It is to be appreciated that the innovation is not limited to the example embodiments. In a general sense, tube locking provides an alternative to the ratchet/sprag functioning of the different mode of operation of prior implementations. As noted, the ratchet/sprag functioning allows both locking and slip between the central sun gear driving output and a plurality of tube movement (in a heating phase), but walks different ends of the SMT during each of the heating and cooling phases instead of having a return mechanism of the present innovation. Prior innovations thus may induce a design limitation as to types of feeder wires (for example, for heating or cooling) in regards to a truly unlimited twist that could be applied by the mechanism. As also noted, the ratchet/sprag functioning draws different considerations due to the purely axial loading of one or more SMT's onto an output driver and may have drawbacks due to all of the SMT's being configured at once to the same sun gear due to counter-indicated ability to force or slip or both. While in accordance with some prior implementations in order to avoid one set of drivers being in direct opposition from the other set of drivers, the selective training and heating would need to be in opposite directions (with opposite placement of sprag and clutch elements as provided). The present innovation mitigates those concerns as described in detail herein.

In contrast to operational sequences presented herein, the operation in prior systems (for example, clutch and sprag designs) may provide for releasing one end of an SMT relative to the other end, but typically, as the output progresses cyclically in the same direction, SMT's would also cyclically rotate in the same direction. A constant "walking" (or rotating) of both ends of the SMT's without return may cause design issues that have not been fully appreciated. For example, if SMT heaters are attached to the SMT's and are electric (either resistive or inductive), the wires connecting the rotating items along with the wires from sensors, such as Thermocouples) may begin to wind until they reach a limit, thereby creating a secondary limit on the true ability to rotate continuously in one (or the other) direction. It is to be appreciated that control to the above sequence may correct for this. For example, by having the same end that has its TLD locked to the Output be the same end that has both TLDs released for SMT retraction (during cooling), coupled with an associated return (with, for example, a return assist mechanism) will prevent having the plurality of SMT's "walk." With such control, it is only the output that is continuously turned, rather than the SMT driver.

In general, and as an introduction to various detailed embodiments, achieving a desired output rotation may depend on a selected sequence of operation of control, specifically herein, control of sets of TLD 432 that comprise one or more transmissions 214 as disclosed above. In general, output rotation may be driven by simultaneous heating of the plurality of SMT's 106 which induces twisting (twisting that may be combined through the gears for a magnified combined torque), and then selectively transmitted this power to the Outputs 204 by the transmission 214 through a selective control of the TLDs 432. Control of TLDs 432 is to be appreciated to include the action of locking and unlocking of a plurality of TLDs 432. It is to be appreciated that once a plurality of SMT's 106 are sufficiently heated and have reached their austenitic state, a rotation motion may be complete for that portion of the thermal cycle, and the heating may be stopped. At that point, using a controlled sequence of TLD 432 changes, the Output 204 may be locked at one end and the gears and SMT's 106 freed-up at the other end, thereby allowing the SMT's 106 to cool and retract without inducing a reciprocal action on the output 204. It is to be appreciated that the mechanism of action is distinct from prior innovations, which provides that the cooling portion of the thermal cycle "walks" (or rotates) a SMT into a new position at both ends, rather than provides a return mechanism for the end that had rotated in provision of force. Once the SMT's 106 have been returned to their original state (and in some embodiments, done so with the assistance of a bias return mechanism 320), the TLDs 432 may be re-configured to again allow continued output rotation in the same direction through another thermal cycle for the plurality of SMTs.

In general and in view of the discussion related to FIG. 5E, it is to be appreciated that for locking a TLD 432, teeth, which are positioned at intervals (for example, at every 2 degrees), may be first positioned into alignment, as a TLD actuator 556 may not force a locking action until teeth can be engaged. It is to be appreciated that an operational sequence may provide for this alignment with a brief period of relative motion of Tube (212 or 444) teeth to a TLD 432 until alignment and lock actuation may occur. As discussed in an embodiment, a sensor 558/562 may be included to provide data as to indicate alignment, or to indicate when a lock is sufficiently engaged. It is to be appreciated that in the embodiment of a TLD spring-loaded version (for example, in the TLD-S described earlier), an actuator may simply be activated whenever a lock is required and a set of sprung-loaded teeth will self-engage the instant alignment occurs, and thus in that embodiment, a sensor 558/562 to establish alignment need not be used, while a sensor 558/562 to confirm a lock completion may still be desired.

With the above general introduction, FIGS. 6A-6E disclose a set of example methods relating to aspects of the innovation. The above discussion is now considered in view from the aspect of the TLD 432 and the action of locking and of unlocking a TLD 432. Such locking and unlocking may yield different circumstances. As an example in FIG. 6A sets out, and generally throughout the series of figures, pairs of transmissions 214 include a "left" and a "right" pair (L214 and R214), each such "left" and "right" indicating a common crank ring 430 of each transmission L214 and R214 as described herein. Additionally, sets of TLDs 432 for each of a pair of Fixed Grip Tubes 212, as well as a pair of Output Grip Tubes 444 are set out in the discussion herein for ease of discussion. It is to be appreciated that the following may be modified to effect other control as contemplated in the disclosed innovation. In the basic operation of FIG. 6A, a system 200 is shown with an Output 204 and a Fixed 202 as described herein. These correspond in the example to Fixed 602 and Output 604. A set of TLDs 432, TLD 672 and 674, may comprise components of a left transmission L214, and another set, TLD 676 and 678, may comprise components of right transmission R214. TLD Control State A680 is shown with TLD 672 in a locked position, TLD 674 in an open position, TLD 676 in a locked (closed) position, and TLD 678 in an open position. Heating is being shown being applied to an SMT 106, and torsion and motion (or force) vectors are shown in arrow form. TLD Control State A682 is shown with TLD 672 in a locked position, TLD 674 in a changed locked position, TLD 676 in a changed open position, and TLD 678 in an open position. A cooling of SMT 106 is shown, and the rotation direction with the TLDs in the listed control positions is indicated. TLD Control State A684 is shown with TLD 672 in a changed open position, TLD 674 in a continued locked position, TLD 676 in a continued open position, and TLD 678 in a changed locked (closed)position. Heating is again being shown being applied to an SMT 106, and torsion and motion (or force) vectors are shown in arrow form. It is to be appreciated that by selectively having a TLD open, that TLD or combination of TLDs may provide for relative motion within a transmission 214 for locking or releasing a Fixed Grip Tube 212 or an Output Grip Tube 444 (with force transferred by a ring gear 426).

Figure 6A:
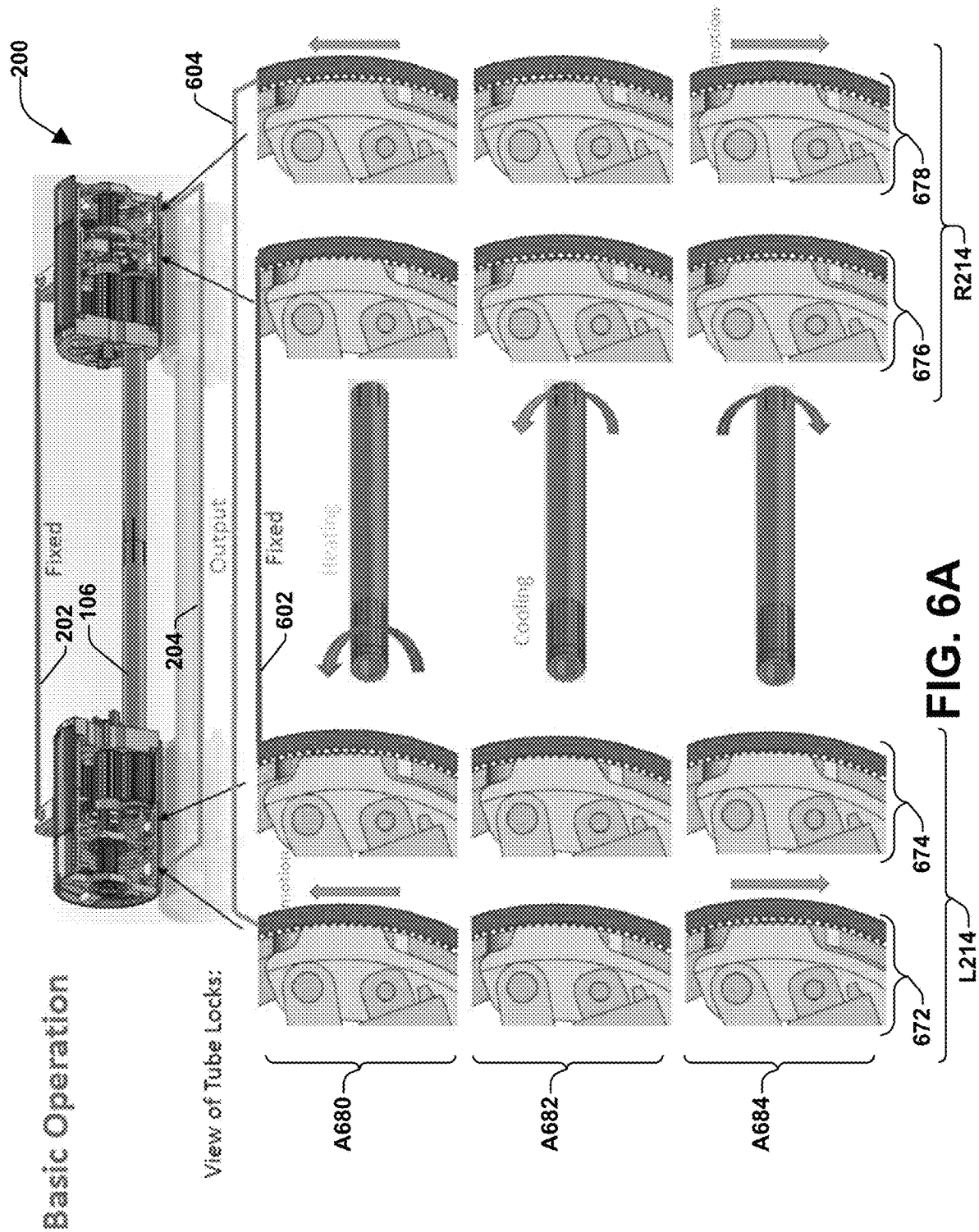
Figure 6B:
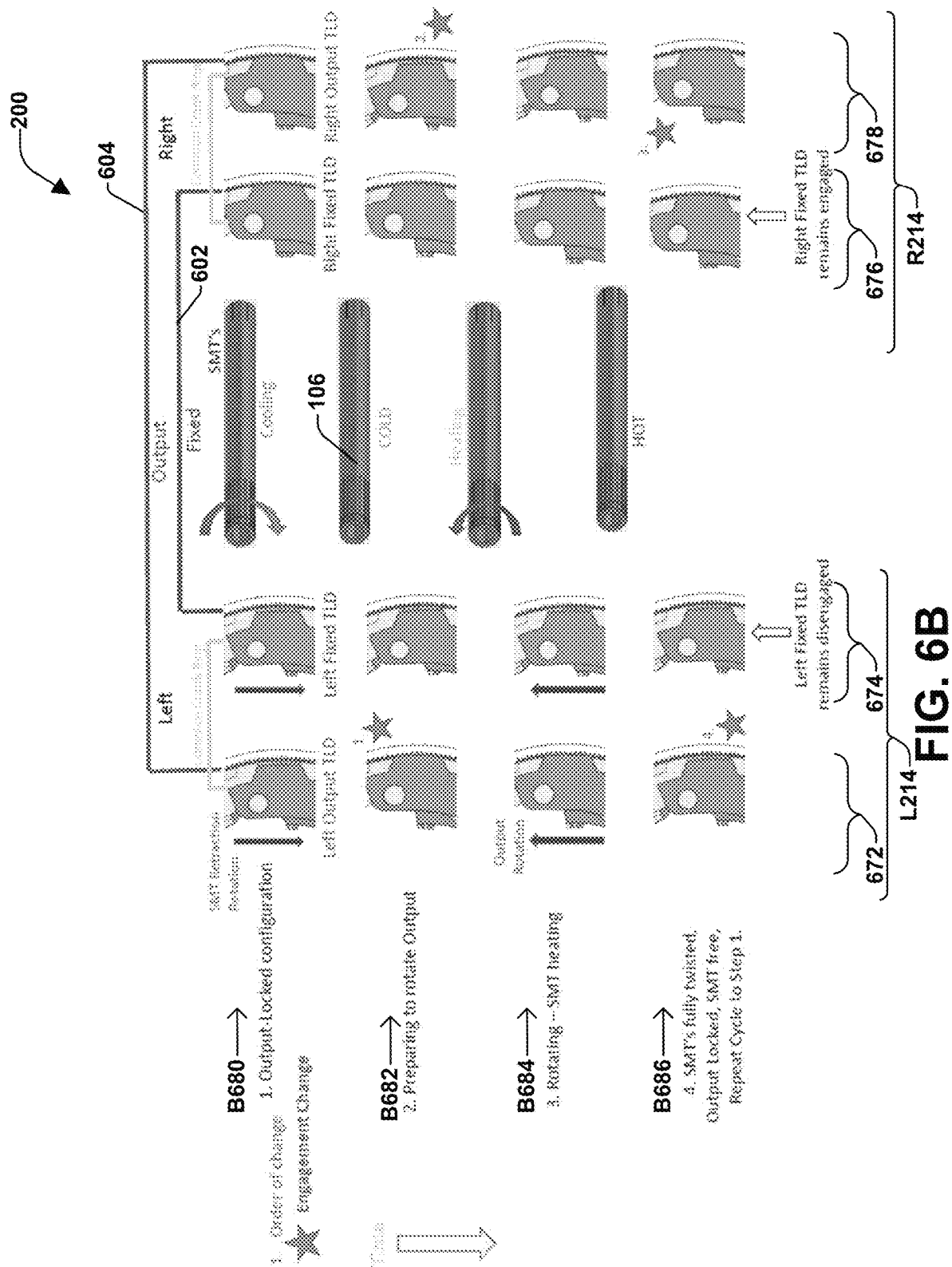

Turning to FIG. 6B, L214, R214, 602, 604, and 106 are provided as shown. For simplicity sake, these maybe as discussed above. Likewise, heating, cooling, force or motion (including torque) are presented in arrow form. For ease of discussion, each of these are to be understood in the context presented. TLD Control State B680 (output-locked configuration) is shown with both TLD 672 and TLD 674 in open position, and both TLD 676 and TLD 678 in locked (closed) position. Cooling is being shown being applied to an SMT 106, and torsion and motion (or force) vectors are shown in arrow form. TLD Control State B682 (preparing to rotate output) is shown with TLD 672 in a changed locked position, TLD 674 in an open position, TLD 676 in a locked position, and TLD 678 in a changed open position. SMT 106 is shown as having finished its cooling, and is ready or preparing for heating and generating rotational power for output. TLD Control State B684 (rotating—SMT heating) is shown with each TLD 672 in the same mode, but heating of SMT 106 being shown. While force is shown for both TLDs on the left transmission L214, TLD 674, being open, does not transmit the force, while TLD 672 may transfer force to output 604. In the right transmission, R214, TLD 678, being open does not transmit any force to output 604 and the locked state of TLD 676 anchors the Fixed 602. Heating is again being shown being applied to an SMT 106, and torsion and motion (or force) vectors are shown in arrow form. TLD Control State B686 (prepare to repeat cycle) is shown with both TLD 672 and TLD 674 in open position, and both TLD 676 and TLD 678 in locked (closed) position. Cooling is being shown being applied to an SMT 106, and torsion and motion (or force) vectors are shown in arrow form. It is to be appreciated that the SMT 106 has fully twisted, provided its power and that in preparing for another duty cycle, output may be locked, and SMT 106 may be free to repeat cycle at Control State B680.

Figure 6C:
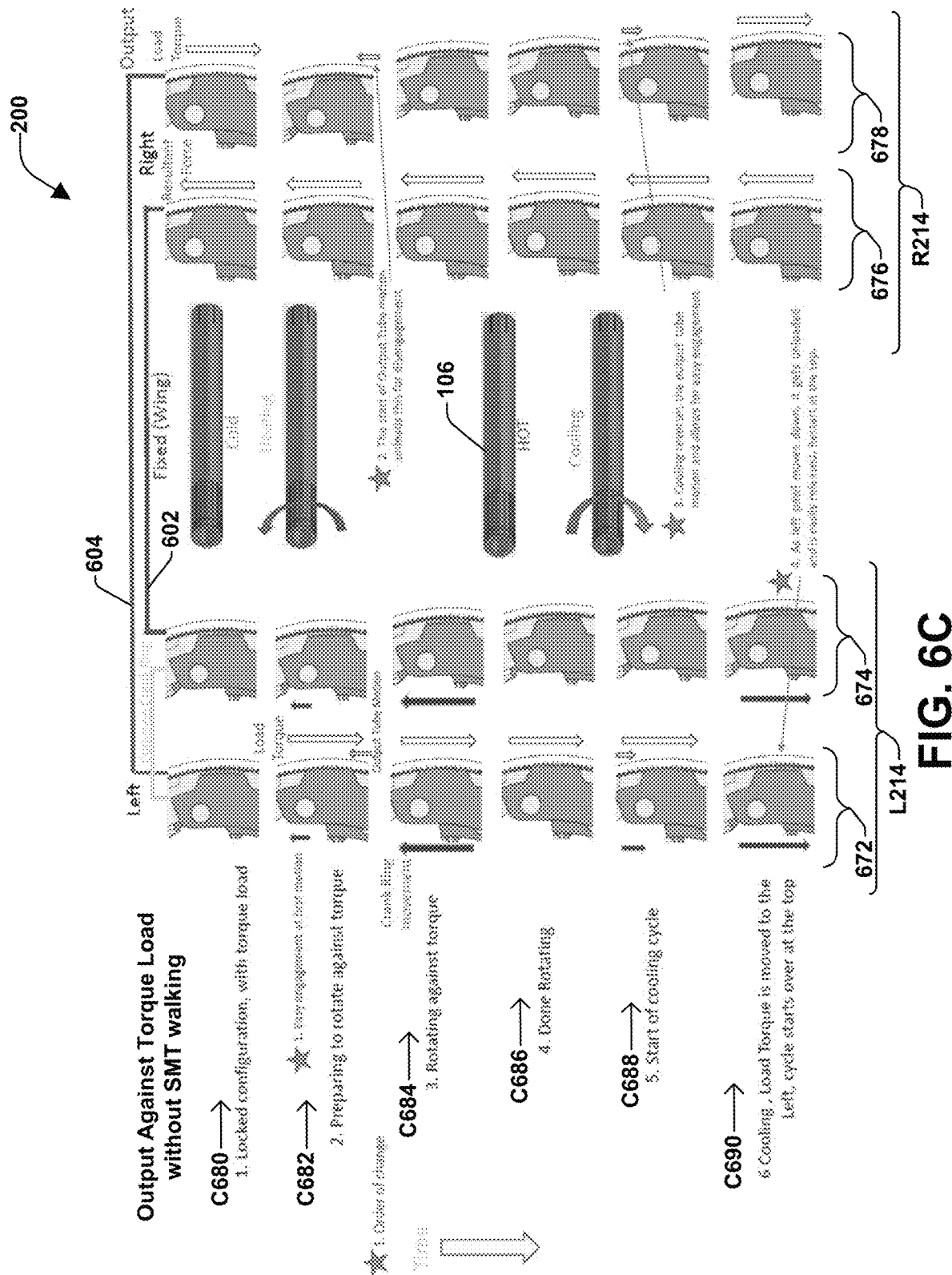

As a segue to discussing a detailed embodiment in FIG. 6C, it is to be appreciated that unlocking a TLD may be more involved. In embodiments, pawls may experience an inward push and pivot joints of the Links 554 may be loaded while torque is still being applied to an output. It is to be appreciated that this may provide friction that may hinder a linear actuator in moving the Links 554 to cause disengagement. It is to be further appreciated that in an embodiment there may be no pawl push or resultant linkage friction, but the friction to move a loaded Pawl teeth out of a locked condition (as will be discussed herein) may be substantial. It is to be appreciated that such may be desirable (even as it may be possible to disengage the TLD with an output load still applied), in order to minimize most any punishing impacts to the TLD actuator, as well as minimize most any impact-like jolts to the whole system. Thus, an operational cycle would provide for unloading the TLD before attempting to disengage it. It is to be appreciated that this example sequence works well for actuation rotation working against a force (for example, lifting the weight of the F-18 Winglet), or for continued loaded rotation, as may be provided by a winch.

Turning to FIG. 6C, L214, R214, 602, 604, and 106 are provided as shown. For simplicity sake, these maybe as discussed above. Likewise, heating, cooling, force or motion (including torque) are presented in arrow form. For ease of discussion, each of these are to be understood in the context presented. While this embodiment is concerned with operational sequences for unloading of a TLD, it is to be appreciated that such an operational sequence is quite similar to the one previously described, except expanded to both add the reality of a residual "Load Torque" as being applied to an Output during an operational cycle (for example, as may be experienced in an embodiment like the one involving a F-18 Winglet). Load direction, and motions may be described as "Up"/"Upward" (CCW as viewed from the left end of the device), or "Down"/"Downward" (CW) referring to a Ring Drive System 200 as viewed from a selected orientation. TLD Control State C680 (locked configuration, with output torque already applied) is shown with shown with both TLD 672 and TLD 674 in open position, and both TLD 676 and TLD 678 in locked (closed) position. While there is no heating being applied to an SMT 106, force vectors (such as a load that is to be moved) are shown in arrow form. TLD Control State C682 (preparing to rotate against torque) is shown with TLD 672 in a changed locked position, TLD 674 still in an open position, TLD 676 in a locked position, and TLD 678 in a changed open position. Heating of SMT 106 is shown, and the rotation direction with the TLDs in the listed control positions is indicated. It is to be appreciated that the transmission L124 is configure for the load, while transmission R124 may rotate freely. Heating has provided start of the output tube 444 motion which unloads the teeth of TLD 678. TLD Control State C684 (rotating against torque) and TLD Control State C686 (done rotating) maintain TLDs in the prior configuration, while the power from the SMT's 106 provide force to output 204 until the heat cycle has finished transforming SMT's 106. Torsion and motion (or force) vectors are shown in arrow form. TLD Control State C688 (start of cooling cycle) provides a change in mode for TLD 678 to a changed locked (closed) position. Locking the output 204 provides for cooling to occur to SMT 106 and SMT 106 to be able to rotate back to its starting orientation without output 204 reciprocating. Cooling is being shown being applied to an SMT 106, and torsion and motion (or force) vectors are shown in arrow form. TLD Control State C690 (Cooling complete, prep for next cycle) is shown with TLD 672 in a changed open position, TLD 674 in a continued open position, and TLDs 676 678 in a continued locked (closed) position. Motion (or force) vectors are shown in arrow form. The end of this state is now ready to mirror Control State C680 to engage in another duty cycle.

Figure 6D:
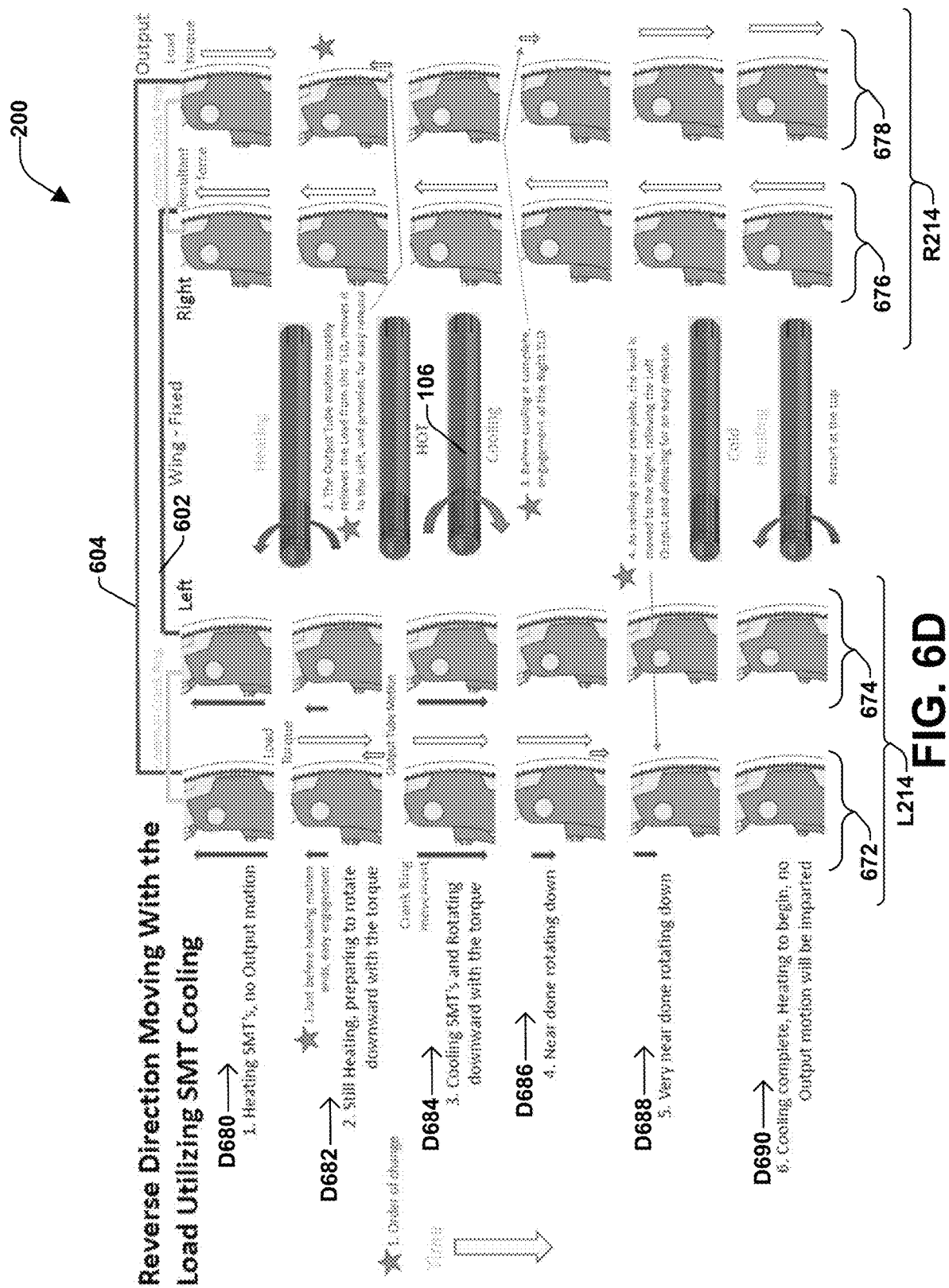

Turning to FIG. 6D, L214, R214, 602, 604, and 106 are provided as shown. For simplicity sake, these maybe as discussed above. Likewise, heating, cooling, force or motion (including torque) are presented in arrow form. For ease of discussion, each of these are to be understood in the context presented. In this embodiment, operation of Ring Drive system 200 may be in a situation of using SMT cooling portion of a thermal cycle for a reverse direction moving with load. In other words, a solution may be to utilize a SMT cooling retraction motion for a desired load lowering rotation. TLD Control State D680 is shown with both TLD 672 and TLD 674 in open position, and both TLD 676 and TLD 678 in locked (closed) position. Heating is being shown being applied to an SMT 106, and torsion and motion (or force) vectors are shown in arrow form. TLD Control State D682 (prepare for downward action) is shown with TLD 672 in a changed locked position, TLD 674 still in an open position, TLD 676 in a locked position, and TLD 678 in a changed open position. Just before heating motion ends, the engagement of the TLDs 672 that will lock has an easy engagement with output tube 444 quickly relieving load from TLD 678 that will open with an easy release. In other words, while the SMT's 106 are approaching their transformation limit, teeth alignment occurs and the TLD 672 is engaged. This causes the Left Output 204 to move upwards a bit (it is to be appreciated that this movement may seem counter-intuitive) and this moves the load from the TLD 678 to the TLD 672. This then relieves the TLD 678 of the load and allows it to be unlocked. TLD Control State D684 (cooling and downward power) is shown with each TLD in the same configuration. Cooling is being shown as being applied to an SMT 106, and torsion and motion (or force) vectors are shown in arrow form. It is to be appreciated that with the cooling providing torque, and the TLDs engaged after easy transitions from TLD Control State D682, Crank Ring 430 within transmission 214L provides force as shown. TLD Control State D686 (transition partial) may be engaged near the end of the thermal cycle as SMT 106 approaches its cooled state. TLD Control State D686 changes TLD 678 to a changed locked (closed) position. This control state transitions to TLD Control State D688 (transition completes). As cooling is near complete, load is moved to the right transmission R214, relieving the left output 204 and providing for an easy release and change of TLD 672 to be in a changed open position. SMT 106 is cold, and rotational power transfer has been completed. With the cooling and retracting of the SMT's also causing/allowing for the load to be lowered, it is to be appreciated that such a load may be assisted with a bias mechanism as disclosed herein, such as for example a torsion spring. Or, since the output load is in the direction of retraction, it can serve to augment, or even replace the bias mechanism. TLD Control State D690 (transition) is shown with each TLD in an unchanged mode, but ready to have SMT 106 heated to return to a ready state for another duty cycle. It is to be appreciated that no output motion maybe imparted during heating for this method embodiment. It is also to be appreciated that in this embodiment, because the Output rotation is dependent on the cooling and retraction behavior of the SMT's 106, this motion behavior (rate and variability) will likely be different than for the Load Raising operation where the Output rotation depends on the heating of the SMT's.

Turning at last to FIG. 6E, L214, R214, 602, 604, and 106 are provided as shown. For simplicity sake, these maybe as discussed above. Likewise, heating, cooling, force or motion (including torque) are presented in arrow form. For ease of discussion, each of these are to be understood in the context presented. This embodiment is similar to FIG. 6C, although in this embodiment, the direction of load raising is in a reverse direction from that of the embodiment as described in FIG. 6C. TLD Control State E680 (locked configuration, with output torque already applied) is shown with shown with both TLD 672 and TLD 674 in locked (closed) position, and both TLD 676 and TLD 678 in open position. While there is no heating being applied to an SMT 106, force vectors (such as a load that is to be moved) are shown in arrow form. It is to be appreciated that a load torques upwards on output 204 (through transmission L214) exists at the onset of this control state, and since transmission R214 is fully open, the resultant force is carried by transmission L214, namely TLD 674. TLD Control State E682 (preparing to rotate against torque) is shown with TLD 672 in a changed open position, TLD 674 still in a locked position, TLD 676 in an open position, and TLD 678 in a changed locked position. Heating of SMT 106 is shown, and the rotation direction with the TLDs in the listed control positions is indicated. It is to be appreciated that the transmission R124 is configure for the load, while transmission L124 may rotate freely at TLD 672, but is fixed at TLD 674. The start of output tube 444 motion unloads TLD 672. Heating has provided start of the output tube 444 motion which provides for an ease of disengagement as the teeth of TLD 672 unload. TLD Control State E684 (rotating against torque) and TLD Control State E686 (done rotating) maintain TLDs in the prior configuration, while the power from the SMT's 106 provide force to output 204 until the heat cycle has finished transforming SMT's 106. Torsion and motion (or force) vectors are shown in arrow form. TLD Control State E688 (start of cooling cycle) provides a change in mode for TLD 672 to a changed locked (closed) position. Locking the output 204 provides for cooling to occur to SMT 106 and SMT 106 to be able to rotate back to its starting orientation without output 204 reciprocating. Cooling is being shown being applied to an SMT 106, and torsion and motion (or force) vectors are shown in arrow form. TLD Control State E690 (Cooling complete, prep for next cycle) is shown with TLD 678 in a changed open position, TLD 674 in a continued open position, and TLDs 676 678 in a continued locked (closed) position. Motion (or force) vectors are shown in arrow form. The end of this state is now ready to mirror Control State E680 to engage in another duty cycle.

It is to be appreciated that while not shown for clarity, one or more embodiments may feature induction wire and insulation of the plurality of SMTs, including routing of the SMT heater wires; attaching and pre-winding of a center Bias Torsion Spring; installing of TLD sensors and routing of their wires; and routing of TLD actuator wires.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A scalable multi-element shape memory alloy (SMA) rotary actuator system comprising:
   a plurality of SMA tubes (SMTs) wherein the plurality of SMTs are trained to provide torque through application of a thermal cycle, wherein each of the plurality of SMTs have a same twist direction for rotary motion;
   a fixed mechanism, wherein the rotary motion is gauged from a fixed point of the rotary actuator system provided by the fixed mechanism;
   an output mechanism, wherein the rotary motion is gauged to move from the fixed point through the output mechanism;
   a controller that controls selective locking and unlocking as well as thermal cycling of the plurality of SMTs;
   a plurality of radially outbound torque driving transmission that comprise a plurality of tube locking devices (TLDs) that through the controlled selective locking and unlocking, by the controller, of a plurality of portions of the plurality of SMTs within the transmission, transform the twist direction of the plurality of SMTs radially outward driven by a ring gear in conjunction with establishment of the fixed mechanism as achieved through a crank gear, such that continual torque is provided in a selected direction to the output mechanism throughout a heating portion of a thermal cycle of the plurality of SMTs; and
   a radial sun shaft associated with a bias return assist mechanism that provides assist to the plurality of SMTs during a cooling portion of the thermal cycling such that the plurality of SMTs are returned to their original orientation, and with the plurality of TLDs that provide that the plurality of SMTs do not rotate relative to their rotational axis, with the respective ends of the plurality of SMTs returning to their starting points for a full thermal cycle of the plurality of SMTs without inducing reciprocating output.

2. The system of claim 1 in that the return to the starting point, by the bias return assist mechanism for the plurality of SMTs for a full thermal cycle provides that the controllers' selective locking and unlocking in order to transfer the twist of the plurality of SMTs into continual torque occurs with induced reciprocating effects of the plurality of SMTs undergoing their thermal cycling without effecting output load and the plurality of SMTs being returned to their original orientation during the thermal cycle provide for prevention of feedwire snagging for unlimited output rotation while the plurality of SMTs do not undergo unlimited rotation around the axis of the SMTs.

3. The system of claim 2 wherein the bias return assist mechanism is provided limited power from the plurality of SMTs through the transmission mechanism and a sun gear associated with the transmission that drives a sun shaft that winds the bias return assist mechanism during one portion of the thermal cycle of the SMTs in order to provide energy during another portion of the thermal cycle.

4. The system of claim 2 wherein the bias return assist mechanism is provided limited power at least in part by a pre-loading not associated with the transmission aside from the sun gear and associated provision of power from the sun gear to the output to provide energy during a portion of the thermal cycle.

5. The system of claim 2 wherein the radially outbound torque driving Transmission is selectively configured to engage with either the ring gear, the crank gear, or both.

6. The system of claim 5 wherein the transmission comprises a plurality of TLDs, each of which comprise a pawl, linear actuator, pivot arms, lock knuckle and engaging teeth, and that where the crank gear and comprise pawl windows such that the plurality of TLDs may pivot to engage the teeth of the and ring gear respectfully.

7. The system of claim 6 wherein the radially outbound torque transfer as driven by the ring gear and the establishment of the fixed mechanism as achieved through the crank gear are effected by the plurality of TLDs.

8. The system of claim 7, wherein the radial sun shaft associated with the bias return assist mechanism provides pivot points for pawl elements of the plurality of TLDs.

9. The system of claim 6 wherein the plurality of TLDs comprise a columnar design that locks upon rotation.

10. The system of claim 6 wherein the plurality of TLDs comprises a modified arm system, linear actuator and spring mechanism.

11. The system of claim 6 wherein pawl teeth are configured by a pawl-pivot arced teeth design in order to provide lift off action for lock release.

12. The system of claim 1 further comprising pawls configured with sensors to determine whether pawls have become engaged.

13. The system of claim 1 further comprising pawls configured with sensors to monitor relative rotational position of the plurality of TLDs to a mating tube teeth to trigger engagement of the plurality of TLDs.

14. The system of claim 1 wherein the plurality of SMTs and radially outbound torque driving transmissions translate along an axis such that a selective engagement of the fixed mechanism and the output mechanism may be obtained, and wherein the controller employs selective locking and unlocking, thermal cycling, and translated plurality of sliding SMTs and associated elements, to transform the twist direction of the plurality of sliding SMTs radially outward into continual torque in controlled manner of changing the application of torque between a plurality of fixed mechanisms and a plurality of output mechanisms.

15. A method of sequencing pairs of tube lock devices (TLDs) for locking and unlocking in order to provide continual rotational torque through a full thermal cycle of a plurality of shape memory alloy tubes (SMTs) without inducing reciprocal motion effects and without engaging in a rotation of the ends of the plurality of SMTs, comprising:
   training, for the plurality of SMTs, to provide twist in a same direction;
   locking the plurality of TLDs on a first end to a fixed mechanism;

inducing thermal cycling that transitions the material state of the plurality of SMTs thereby inducing coordinated torque, wherein the induced torque is applied outbound to a ring gear;

deriving a portion of the induced torque to provide inbound power, to a sun shaft through a sun gear to wind a bias return mechanism;

deriving the remaining portion to outbound power and selectively transmitting to an output mechanism by the transmission through a selective control of the TLDs;

complete heating the plurality of SMTs when they have reached their austenitic state, and at that point, using a predetermined sequence of changes of the plurality of TLDs, the output mechanism is locked at one end and gears and the plurality of SMTs freed-up at another end thereby allowing the plurality of SMTs to cool and retract without inducing a reciprocal action on the output mechanism;

controlling which end of the plurality of SMTs to be locked and which end to be freely rotating while cooling, such that the plurality of TLDs provide both a lock on the output mechanism as well as the plurality of SMTs with the assist of the bias return mechanism to return the plurality of SMTs to their original position during the cooling phase of the thermal cycle, thereby preventing the plurality of SMTs to move rotationally around a respective axis of the plurality of SMTs during the thermal cycle; and once the plurality of SMTs have been returned to their original state, the plurality of TLDs re-configured again to allow continued output rotation in the same direction, wherein feed wires or the fixed mechanism, the output mechanism and/or the return mechanism involved in providing inputs to thermal processing or control of sensors are not faced with a plurality of overall rotational limits.

16. The method of claim 15, and continuing preparing for rotation, and engaging, while the output mechanism is still locked to the fixed mechanism, and a right fixed TLD;

disengaging a left fixed TLD;

subsequently employing a heat cycle, twisting the plurality of SMTs, wherein the right fixed TLD has that end of the plurality of SMTs anchored while the twist of the left fixed TLD is transmitted through a left output TLD, thereby providing output rotation;

engaging the left fixed TLD, after the SMT's are heated to the austenitic state, thereby locking the output mechanism to the fixed mechanism;

disengaging the right fixed TLD, that provides the plurality of SMTs to be free to cool and be retracted with the assistance; and continuing, upon the plurality of SMTs being cooled and retracted, to be re-engaged such that a motion cycle is set to begin again.

* * * * *